(12) United States Patent
Takanashi

(10) Patent No.: US 10,897,565 B2
(45) Date of Patent: Jan. 19, 2021

(54) IMAGING APPARATUS AND ACCESSORY DEVICE

(71) Applicant: CANON KABUSHIKI KAISHA, Tokyo (JP)

(72) Inventor: Hideya Takanashi, Isehara (JP)

(73) Assignee: CANON KABUUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/992,301

(22) Filed: May 30, 2018

(65) Prior Publication Data

US 2018/0352138 A1 Dec. 6, 2018

(30) Foreign Application Priority Data

May 31, 2017 (JP) .................................. 2017-108204
May 18, 2018 (JP) .................................. 2018-095847

(51) Int. Cl.
*H04N 5/232* (2006.01)
*G03B 17/56* (2006.01)
*H04N 5/225* (2006.01)

(52) U.S. Cl.
CPC ....... *H04N 5/23209* (2013.01); *G03B 17/565* (2013.01); *H04N 5/2254* (2013.01)

(58) Field of Classification Search
CPC ........... H04N 5/23212; H04N 5/23216; H04N 5/23293; H04N 5/272; H04N 5/232933;
(Continued)

(56) References Cited

U.S. PATENT DOCUMENTS 8,708,585 B2 * 4/2014 Osawa ................... G03B 17/14
396/529
2007/0003269 A1 * 1/2007 Ueda ..................... G03B 17/14
396/257
(Continued)

FOREIGN PATENT DOCUMENTS

CN 103491294 A 1/2014
CN 105359023 A 2/2016
(Continued)

OTHER PUBLICATIONS

The above patent documents were cited in a European Search Report dated Sep. 14, 2018, a copy of which enclosed, that issued in the corresponding European Patent Application No. 18175141.3.
(Continued)

*Primary Examiner* — Lin Ye
*Assistant Examiner* — John H Morehead, III
(74) *Attorney, Agent, or Firm* — Cowan, Liebowitz & Latman, P.C.

(57) ABSTRACT

An imaging apparatus includes: a first camera communication control unit configured to transmit, from the imaging apparatus to the accessory device, a control command for controlling operations of the accessory device, via a first communication channel provided between the imaging apparatus and the accessory device, and receive data transmitted from the accessory device in response to the control command; and a second camera communication control unit configured to receive optical data of the accessory device transmitted from the accessory device, via a second communication channel provided between the imaging apparatus and the accessory device separate from the first communication channel.

29 Claims, 21 Drawing Sheets

(58) Field of Classification Search
CPC ......... H04N 5/232127; H04N 5/23218; H04N 5/2226; G02B 7/28
See application file for complete search history.

(56) References Cited

U.S. PATENT DOCUMENTS

| | | | | |
|---|---|---|---|---|
| 2008/0111900 | A1* | 5/2008 | Numako | H04N 5/23212 348/240.2 |
| 2009/0256950 | A1* | 10/2009 | Kawazoe | G03B 19/12 348/345 |
| 2010/0026875 | A1 | 2/2010 | Shirai | |
| 2011/0170853 | A1* | 7/2011 | Osawa | G03B 17/14 396/529 |
| 2011/0229118 | A1* | 9/2011 | Imafuji | H04N 5/23209 396/529 |
| 2014/0300770 | A1 | 10/2014 | Izukawa | |
| 2015/0229815 | A1* | 8/2015 | Nonaka | H04N 5/23293 348/218.1 |
| 2015/0281582 | A1* | 10/2015 | Sakurai | H04N 5/23287 348/208.2 |
| 2016/0006923 | A1* | 1/2016 | Imamura | G03B 17/14 348/208.11 |
| 2016/0227083 | A1* | 8/2016 | Imamura | H04N 9/8042 |
| 2016/0269617 | A1* | 9/2016 | Tomita | G03B 17/14 |
| 2017/0343768 | A1* | 11/2017 | Shirai | H04N 5/225 |

FOREIGN PATENT DOCUMENTS

| | | |
|---|---|---|
| EP | 1542455 A2 | 6/2005 |
| EP | 2848994 A1 | 3/2015 |
| JP | 2013-130617 A | 7/2013 |
| JP | 2013-182118 A | 9/2013 |
| JP | 5517486 B2 | 6/2014 |
| JP | 2016-066103 A | 4/2016 |
| WO | 2013/171997 A1 | 11/2013 |

OTHER PUBLICATIONS

The above foreign patent documents were cited in a May 21, 2020 Chinese Office Action, a copy of which is enclosed with an English Translation, that issued in Chinese Patent Application No. 201810537832.5.

* cited by examiner

FIG. 4A
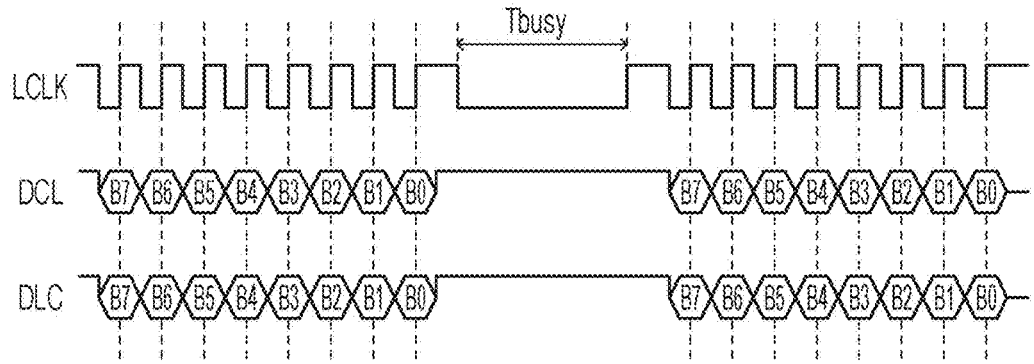
FIG. 4B1
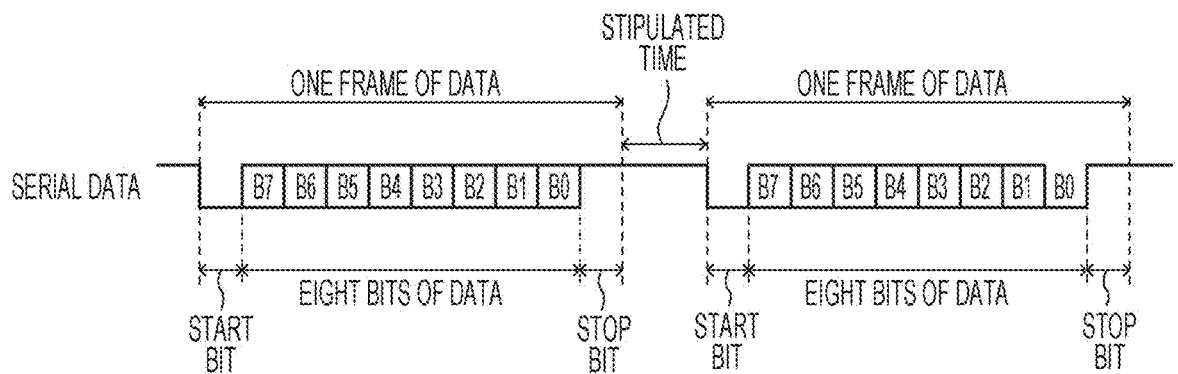
FIG. 4B2
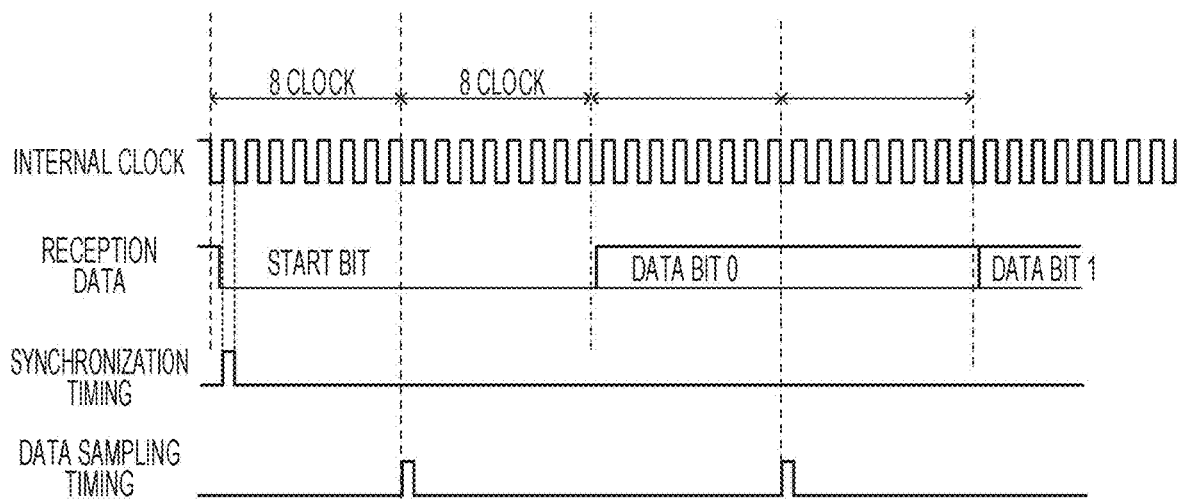

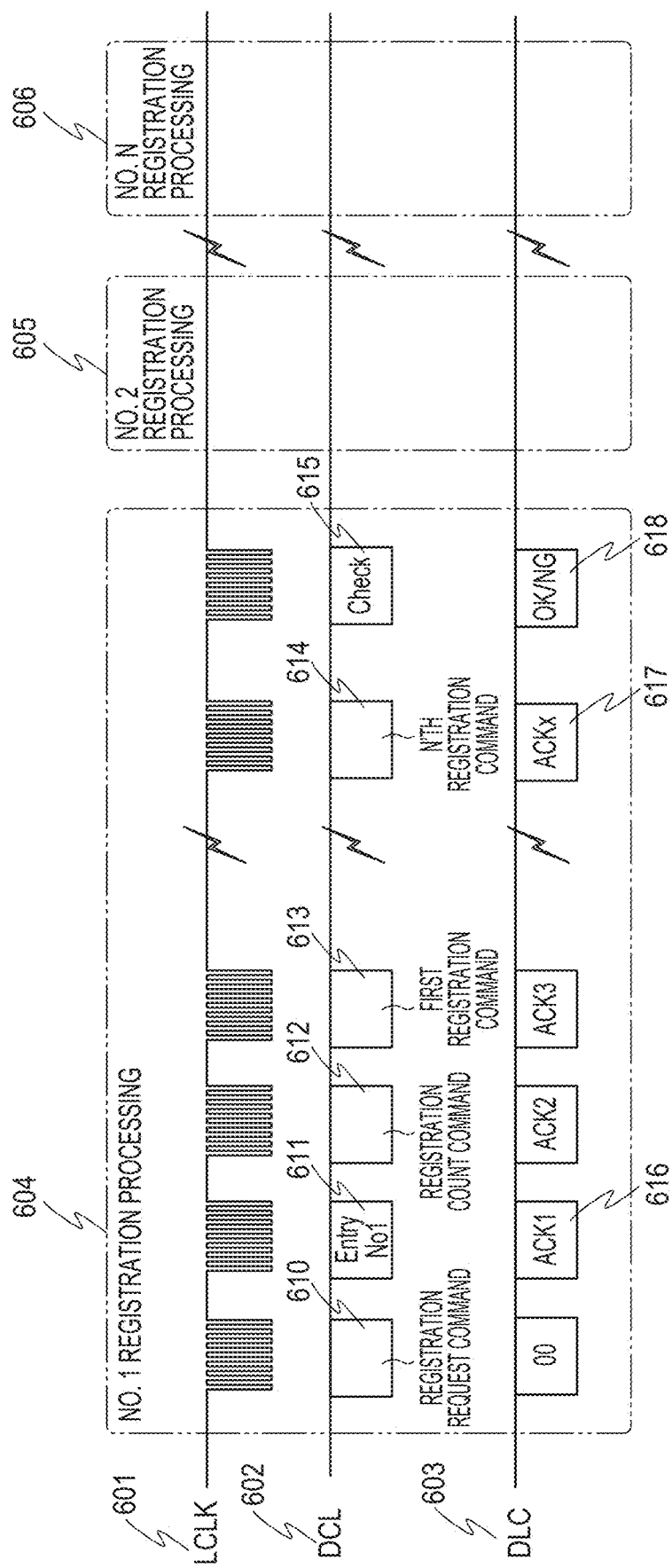

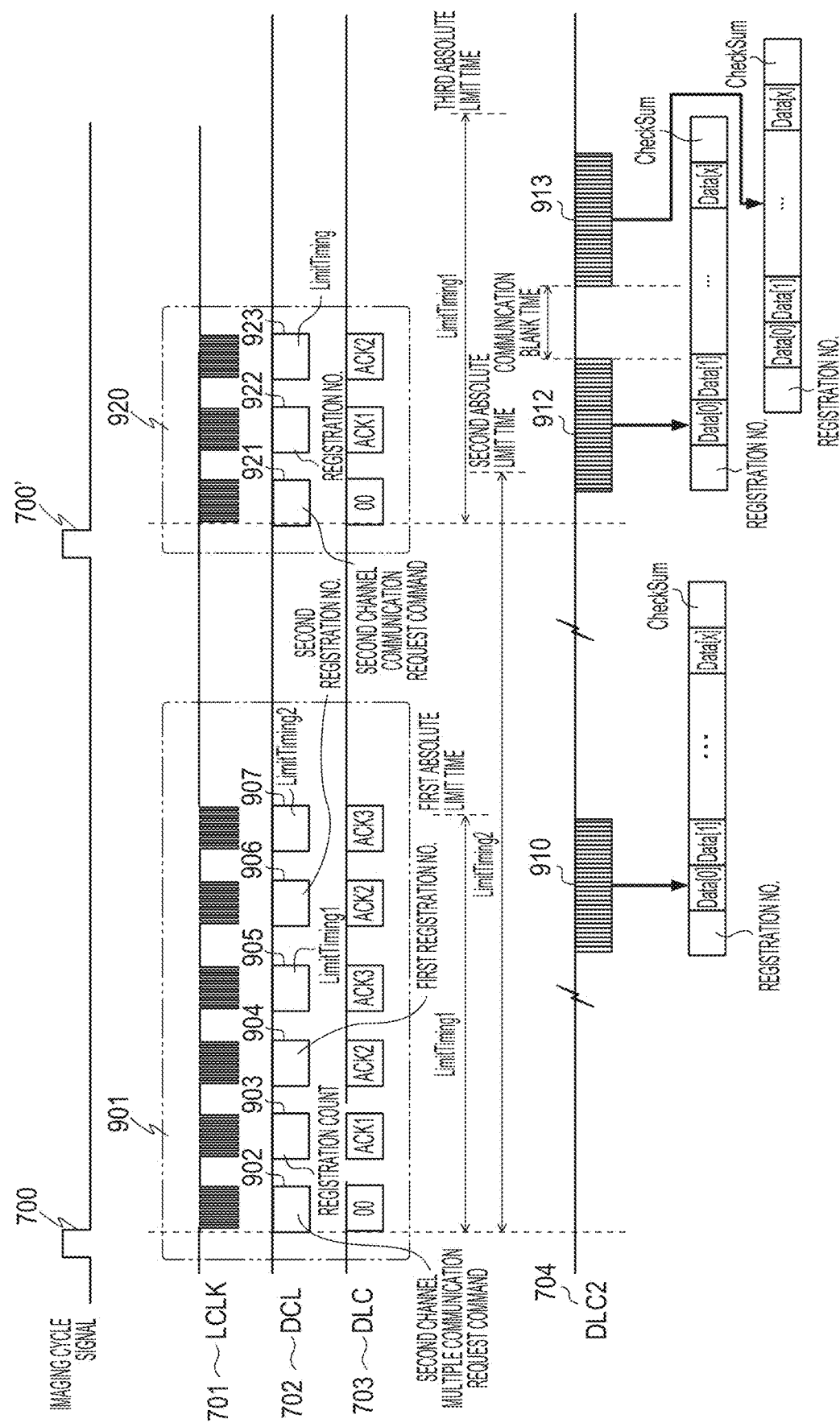

FIG. 12

COMMUNICATION COMMAND EXAMPLE (1)

| DCL | 0x99 (COMMUNICATION LOGIC RESET REQUEST COMMAND FOR SECOND COMMUNICATION CHANNEL) |
|---|---|
| DLC | DON'T CARE |

COMMUNICATION COMMAND EXAMPLE (2)

| DCL | 0xAA (COMMUNICATION RATE CAPABLE INFORMATION NOTIFICATION COMMAND FOR SECOND COMMUNICATION CHANNEL) | 0x1F (COMMUNICATION RATE INFORMATION) |
|---|---|---|
| DLC | DON'T CARE | DON'T CARE |

COMMUNICATION COMMAND EXAMPLE (3)

| DCL | 0xBB (COMMUNICATION RATE CAPABLE INFORMATION ACQUISITION COMMAND FOR SECOND COMMUNICATION CHANNEL) | DON'T CARE |
|---|---|---|
| DLC | DON'T CARE | 0x07 (COMMUNICATION RATE INFORMATION) |

COMMUNICATION COMMAND EXAMPLE (4)

| DCL | 0xCC (USAGE COMMUNICATION RATE NOTIFICATION COMMAND FOR SECOND COMMUNICATION CHANNEL) | 0x04 (COMMUNICATION RATE INFORMATION) |
|---|---|---|
| DLC | DON'T CARE | DON'T CARE |

COMMUNICATION COMMAND EXAMPLE (5)

| DCL | 0xDD (DATA REGISTRATION REQUEST COMMAND FOR SECOND COMMUNICATION CHANNEL) | 0x0A (REGISTRATION COUNT) | 0x11 (FOCAL LENGTH ACQUISITION) | 0x12 (APERTURE DIAMETER INFORMATION ACQUISITION) | ... | 0x1A (FOCUS CORRECTION INFORMATION ACQUISITION) |
|---|---|---|---|---|---|---|
| DLC | DON'T CARE | Ack | Ack | Ack | ... | Ack |

COMMUNICATION COMMAND EXAMPLE (6)

| DCL | 0xE0 (COMMUNICATION REQUEST COMMAND FOR SECOND CHANNEL) | 0x01 (REGISTRATION NO.) | 0x64 (LimitTiming) |
|---|---|---|---|
| DLC | DON'T CARE | Ack | Ack |

COMMUNICATION COMMAND EXAMPLE (7)

| DCL | 0xE1 (COMMUNICATION CANCELLATION REQUEST COMMAND FOR SECOND CHANNEL) | 0x01 (REGISTRATION NO.) |
|---|---|---|
| DLC | DON'T CARE | Ack |

FIG. 14

| REGISTRATION NO. | REGISTRATION DATA DEFINITIONS |
|---|---|
| 1 | FOCAL LENGTH INFORMATION (2), APERTURE DIAMETER INFORMATION (3), FOCUS POSITION INFORMATION (2), ZOOM POSITION INFORMATION (2), GYRO INFORMATION (20), ..., FOCUS CORRECTION INFORMATION (100) |
| 2 | FOCUS POSITION INFORMATION (2), ..., FOCUS CORRECTION INFORMATION (100) |
| 3 | FOCAL LENGTH INFORMATION (2), APERTURE DIAMETER INFORMATION (3), ZOOM POSITION INFORMATION (2), ..., CURRENT APERTURE POSITION INFORMATION (3) |
| 4 | GYRO INFORMATION (20), ..., TRIPOD FIXATION DETERMINATION INFORMATION (1) |
| ... | ... |
| N | RESERVED |

IMAGING APPARATUS AND ACCESSORY DEVICE

BACKGROUND OF THE INVENTION

Field of the Disclosure

The present invention relates to an imaging device (hereinafter referred to as "camera body") and an accessory device such as an interchangeable lens or the like, that are communicable with each other.

Description of the Related Art

In an accessory interchanging camera system, including a camera body from which accessory devices are detachable, communication is performed for the camera body to control operations of the accessory device, and for the accessory device to provide data necessary for that control and for imaging to the camera body. Particularly, in a case of imaging moving images for recording or moving images for live view display using an interchangeable lens, smooth lens control matching the imaging cycle is required. Accordingly, the imaging timing of the camera body and the control timing of the interchangeable lens need to be synchronized. To this end, the camera body needs to complete reception of data from the interchangeable lens and transmission of various types of commands, requests, and so forth, to the interchangeable lens, within an imaging cycle. However, increase in the data amount that the camera body receives from the interchangeable lens, and shortening of the imaging cycle (higher frame rates) has led to the need for even faster communication of large amounts of data.

Japanese Patent Laid-Open No. 2013-182118 discloses a camera system that performs data transmission using two lines that originally were provided for bidirectional communication as two lines for one-way communication, in order to transmit great amounts of data from the interchangeable lens to the camera body at high speeds. Japanese Patent No. 5,517,486 discloses a camera system where, when performing asynchronous communication between the camera body and interchangeable lens, the interchangeable lens serves as a communication master to arbitrate data transmission to the camera body.

In the camera system disclosed in Japanese Patent Laid-Open No. 2013-182118, while great amounts of data can be transmitted from the interchangeable lens to the camera body, control commands cannot be transmitted from the camera body to the interchangeable lens during this data transmission. That is to say, transmission of control commands from the camera body instructing operations at the interchangeable lens, such as driving the diaphragm or focusing ring or the like, must wait until transmission of data from the interchangeable lens to the camera body ends. As a result, the timing at which operations of the interchangeable lens are performed in response to the control commands are delayed.

On the other hand, in the camera system disclosed in Japanese Patent No. 5,517,486, the interchangeable lens that is the communication master transmits data to the camera body at a desired timing, and transmission of control commands from the camera body to the interchangeable lens is permitted by interrupting transmission of the data. According to this, delay of transmission of control commands form the camera body to the interchangeable lens can be avoided, but transmission of data from the interchangeable lens to the camera body will be delayed.

SUMMARY OF THE INVENTION

It has been found desirable to provide an imaging apparatus and accessory device where control commands can be transmitted from the imaging apparatus to the accessory device without delay, while transmitting great amounts of data from the accessory device to the imaging apparatus at high speed.

According to one aspect of the present invention, an imaging apparatus to which an accessory device is detachably mounted, includes: a first camera communication control unit configured to transmit, from the imaging apparatus to the accessory device, a control command for controlling operations of the accessory device, via a first communication channel provided between the imaging apparatus and the accessory device, and receive data transmitted from the accessory device in response to the control command; and a second camera communication control unit configured to receive optical data of the accessory device transmitted from the accessory device, via a second communication channel provided between the imaging apparatus and the accessory device separate from the first communication channel. The first camera communication control unit transmits, to the accessory device, a data specification command specifying the optical data of which transmission is requested, via the first communication channel.

Another aspect of the present invention is an accessory device detachably mounted to the above-described imaging apparatus. The optical data is transmitted via the second communication channel, in response to the control command received from the imaging apparatus via the first communication channel.

Another aspect of the present invention is an accessory device to which an imaging apparatus is detachably mounted. The accessory device includes: a first accessory communication control unit configured to receive, via a first communication channel provided between the accessory device and the imaging apparatus, a control command from the imaging apparatus for controlling operations of the accessory device, and transmitting data to the imaging apparatus from the accessory device in response to the control command; a second accessory communication control unit configured to transmit optical data of the accessory device, via a second communication channel provided between the accessory device and the imaging apparatus separate from the first communication channel. The second accessory communication control unit transmits optical data in response to a data specification command, specifying the optical data of which the imaging apparatus requests the accessory device for transmission, which the first accessory communication control unit has received from the imaging apparatus.

Another aspect of the present invention is an imaging apparatus to which an accessory device is attachable. The imaging apparatus includes a first communication line configured to transmit a timing signal corresponding to a timing of communication with the accessory device, a second communication line configured to transmit a first command relating to operations of the accessory device at a timing corresponding to the timing signal, a third communication line configured to receive data corresponding to the first command at a timing corresponding to the timing signals, a fourth communication line configured to receive data regardless of timing indicated by the timing signal, and a communication control unit configured to control communication by the first communication line, the second communication line, the third communication line, and the fourth communication line.

Another aspect of the present invention is an accessory device detachably mounted to the imaging apparatus. The optical data is transmitted to the imaging apparatus via the fourth communication line in accordance with the second command received from the imaging apparatus via the second communication line.

Another aspect of the present invention is an accessory device attachable to an imaging apparatus, including a first communication line configured to receive a timing signal corresponding to a timing of communication with the imaging apparatus, a second communication line configured to receive a first command relating to operations of the accessory device, at a timing corresponding to the timing signal, a third communication line configured to transmit data corresponding to the first command, at a timing corresponding to the timing signal, a fourth communication line configured to transmit data, regardless of timing indicated by the timing signal, and a communication control unit configured to control communication over the first communication line, the second communication line, the third communication line, and the fourth communication line.

Further features of the present invention will become apparent from the following description of exemplary embodiments with reference to the attached drawings.

BRIEF DESCRIPTION OF THE DRAWINGS

FIGS. 4A and 4B1 through 4B2 are diagrams for describing a communication format between the camera body and interchangeable lens according to one or more aspects of the present disclosure.

FIG. 6 is a diagram explaining optical data definitions according to one or more aspects of the present disclosure.

FIG. 9 is a diagram illustrating communication processing over a second communication channel according to one or more aspects of the present disclosure.

FIG. 12 is a diagram illustrating examples of communication commands according to one or more aspects of the present disclosure.

FIG. 14 is a diagram illustrating optical data definitions according to one or more aspects of the present disclosure.

DESCRIPTION OF THE EMBODIMENTS

Embodiments of the present invention will be described with reference to the drawings.

First Embodiment

Figure 1:
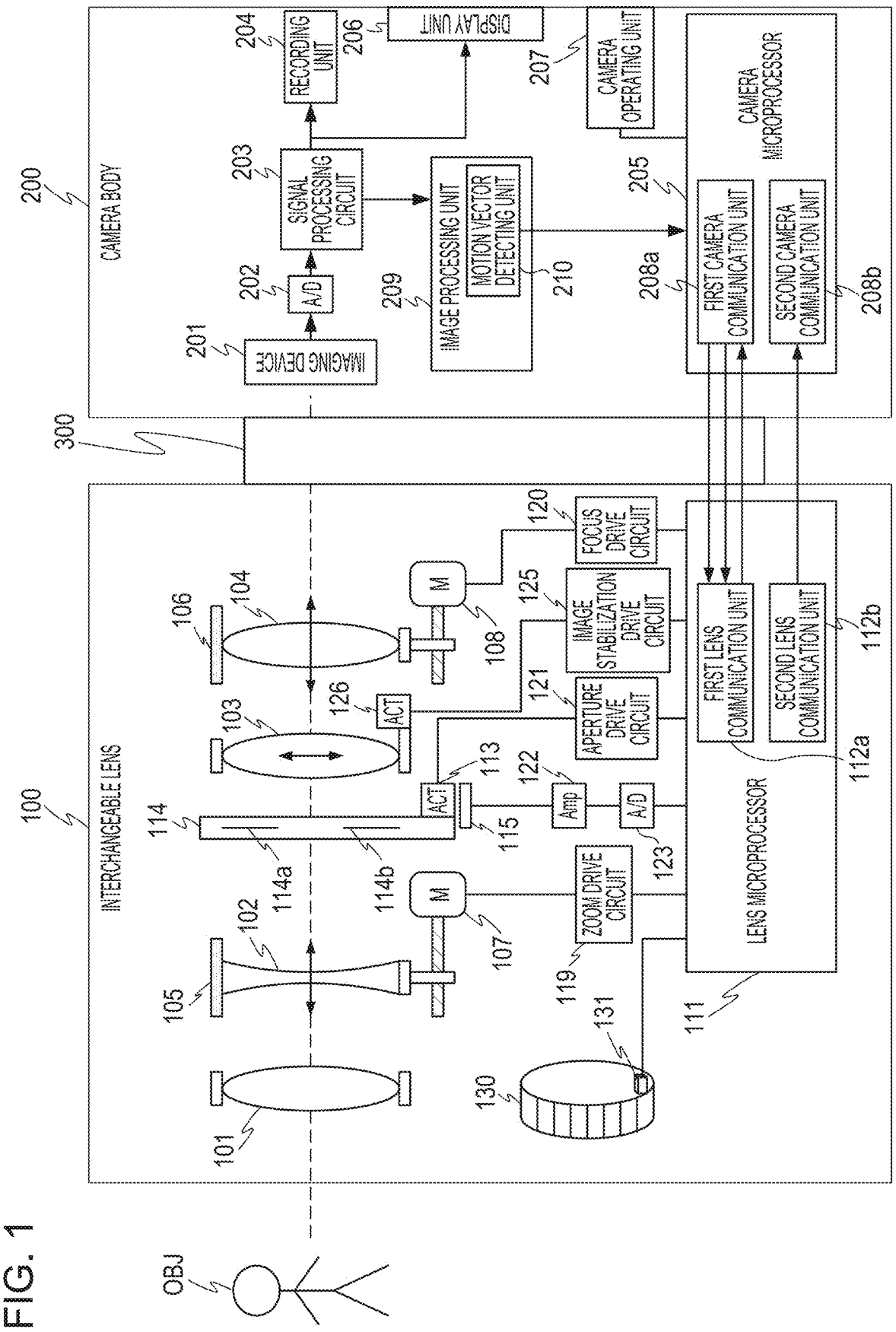
FIG. 1 is a diagram illustrating the configuration of a camera body and interchangeable lens making up a camera system according to one or more aspects of the present disclosure.

FIG. 1 exemplarily illustrates the configuration of an imaging system (hereinafter referred to as "camera system") including a camera body 200 serving as an imaging apparatus, and an interchangeable lens 100 serving as an accessory device detachably mounted thereto, as a first embodiment of the present invention. Although the interchangeable lens 100 is exemplarily illustrated as the accessory device in the present embodiment, the present invention can be applied to devices other than interchangeable lenses, as long as the device is directly or indirectly connectable to the camera body 200, and can communicate with the camera body 200.

The camera body 200 has an imaging device 201, such as a charge-coupled device (CCD) sensor, complementary metal-oxide semiconductor (CMOS) sensor, or the like, and the interchangeable lens 100 has an imaging optical system that forms an image of an object on the imaging device 201. The camera body 200 and interchangeable lens 100) use three-line clock synchronous communication or asynchronous communication to transmit control commands from the camera body 200 to the interchangeable lens 100 as first commands. A control command is a signal controlling (instructing) zooming operations, light amount adjustment operations, focusing operations, and image stabilization operations. The interchangeable lens 100 transmits data (also referred to as "first data") to the camera body 200, in response to control commands received from the camera body 200.

Further, the interchangeable lens 100 transmits optical data of the interchangeable lens 100 (an example of second data) to the camera body 200. Optical data includes optical state data indicating the optical state, such as focal length of the photographing optical system, aperture diameter, position of focus lens, and so forth, within the interchangeable lens 100, and optical correction data such as focus correction data necessary for autofocus (AF). This optical data is transmitted to the camera body 200, in accordance with data specification commands, serving as second commands, that are transmitted from the camera body 200 to the interchangeable lens 100.

A specific configuration of the interchangeable lens 100 and camera body 200 will be described. The interchangeable lens 100 and camera body 200 are mechanically and electrically connected via a mount 300 that is a joining mechanism. The interchangeable lens 100 is supplied with electric power source from the camera body 200 via an electric power source terminal portion (omitted from illustration) provided at the mount 300, and operates various types of actuators and a lens microprocessor 111. The interchangeable lens 100 and camera body 200 also perform communication with each other via a communication terminal portion (illustrated in FIG. 2) that is provided at the mount 300.

The imaging optical system of the interchangeable lens 100 includes, in order from the side of an object OBJ, a field lens 101, a zoom lens 102 for zooming, an aperture unit 114 that adjusts the amount of light, an image stabilizing lens 103, and a focus lens 104 for focusing. The zoom lens 102 and focus lens 104 are held by lens holding frames 105 and 106, respectively. The lens holding frames 105 and 106 are movably guided in the optical axis direction indicated in FIG. 1 by a dashed line, by a guide shaft omitted from illustration, and respectively are driven in the optical axis direction by a zoom actuator 107 and focus actuator 108, which are configured of stepping motors. The zoom actuator 107 and focus actuator 108 respectively move the zoom lens 102 and focus lens 104, synchronously with driving pulses.

The image stabilizing lens 103 reduces image blurring due to shaking of hands holding the camera or the like, or shaking of the camera, by moving (shifting) in a direction orthogonal to the optical axis of the imaging optical system. The camera system according to the present embodiment can also perform image stabilization control by the camera body 200 and interchangeable lens 100 communicating in order for the camera body 200 and interchangeable lens 100 to coordinate with each other and further raise image stabilization effects. These coordinated operations need communication processing with high real-time performance between the camera body 200 and interchangeable lens 100. Specifically, the interchangeable lens 100 transmits, to the camera body 200, information of camera shaking detected by a shake sensor such as a vibrating gyroscope or the like (omitted from illustration), provided within the interchangeable lens 100, within a charge accumulation period of the imaging device 201 when imaging at the camera body 200. The interchangeable lens 100 also receives information of motion vectors from the camera body 200, so as to be in time for image stabilizing driving where the image stabilizing lens 103 is shifted. In order to realize such high real-time performance in the present embodiment, a later-described first communication channel and second communication channel are separately provided. Note that "communication channel" as used in the present embodiment means an increment of communication path for realizing desired communication functions, and each communication channel is configured of one or more communication lines.

The lens microprocessor 111 is an accessory control unit that controls operations of various parts within the interchangeable lens 100. The lens microprocessor 111 communicates with a camera microprocessor 205 in the camera body 200, via a first lens communication unit 112a serving as a first accessory communication control unit, and a second lens communication unit 112b serving as a second accessory communication control unit. In FIG. 1, the first lens communication unit 112a is written as "first lens communication unit", and the second lens communication unit 112b is written as "second lens communication unit". The first lens communication unit 112a forms a first communication channel (hereinafter "first communication channel") with the camera microprocessor 205. The second lens communication unit 112b forms a second communication channel (hereinafter "second communication channel") with the camera microprocessor 205.

The lens microprocessor 111 receives control commands, and data specification commands (later-described registration No. commands) specifying optical data which the lens microprocessor 111 is requested to transmit, which are transmitted from the camera microprocessor 205 via the first communication channel, at the first lens communication unit 112a. The lens microprocessor 111 also transmits data as a response to the above control commands from the first lens communication unit 112a to the camera microprocessor 205 via the first communication channel. On the other hand, the lens microprocessor 111 transmits the above optical data from the second lens communication unit 112b to the camera microprocessor 205 via the second communication channel. The lens microprocessor 111 controls communication with the camera microprocessor 205 in accordance with a communication control program that is a computer program.

Specifically, the lens microprocessor 111 causes a zoom drive circuit 119 and a focus drive circuit 120 to respectively drive the zoom actuator 107 and focus actuator 108, in accordance with control commands from the camera microprocessor 205 regarding zooming and focusing operations. Accordingly, zooming processing where zooming operations by the zoom lens 102 are controlled, and autofocus (AF) processing where focusing operations by the focus lens 104 are controlled, are carried out.

The interchangeable lens 10) has a manual focus ring 130 that can be rotationally operated by the user, and a focus encoder 131 that detects the rotation operation amount of this manual focus ring 130. The lens microprocessor 111 causes the focus drive circuit 120 to drive the focus actuator 108 and move the focus lens 104 in accordance with the rotation operation amount of the manual focus ring 130 detected by the focus encoder 131. Thus, manual focus (MF) is carried out.

The aperture unit 114 has aperture blades 114a and 114b, and an aperture actuator 113 that moves these so as to open and close. The state (position) of the aperture blades 114a and 114b is detected by a Hall effect device 115, and output signals from the Hall effect device 115 are input to the lens microprocessor 111 via an amplifying circuit 122 and an A/D conversion circuit 123. The lens microprocessor 111 causes an aperture drive circuit 121 to drive the aperture actuator 113 based on input signals from the A/D conversion circuit 123. The lens microprocessor 111 causes the aperture drive circuit 121 to drive the aperture actuator 113 in accordance with control commands regarding light amount adjustment operations from the camera microprocessor 205. Accordingly, light amount adjustment processing where light amount adjustment operations of the aperture unit 114 are control is performed.

Further, the lens microprocessor 111 drives an image stabilization armature 126 via an image stabilization drive circuit 125 in accordance with shaking detected by an unshown shaking sensor such as a vibrating gyroscope or the like, provided in the interchangeable lens 100. The lens microprocessor 111 causes the image stabilization drive circuit 125 to drive the image stabilization armature 126 in response to control commands regarding image stabilization operations from the camera microprocessor 205. Accordingly, image stabilization processing is performed where image stabilization operations of the image stabilizing lens 103 being moved to reduce (correct) blurring are controlled.

The camera body 200 has the above-described imaging device 201, an A/D conversion circuit 202, a signal processing circuit 203, a recording unit 204, the camera microprocessor 205, and a display unit 206. The imaging device 201 performs photoelectric conversion of a subject image formed by the imaging optical system within the interchangeable lens 100, and outputs electric signals (analog signals). The A/D conversion circuit 202 converts the analog signals from the imaging device 201 into digital signals.

The signal processing circuit 203 performs various types of image processing on the digital signals from the A/D conversion circuit 202 and generates image signals. The signal processing circuit 203 also generates focus information indicating the contrast state of the subject image, i.e., the focus state of the imaging optical system, and luminance information representing the exposure state, from the image signals. The signal processing circuit 203 outputs the image signals to the display unit 206, and the display unit 206 displays the image signals as a live view image used to confirm composition, focus state, and so forth. The signal processing circuit 203 also outputs the image signals to the recording unit 204, and the recording unit 204 records the image signals.

An image processing unit 209 performs correction processing on the image signals generated by the signal processing circuit 203, for correction of various types of aberration. The image processing unit 209 includes a motion vector detecting unit 210. The motion vector detecting unit 210 detects motion vectors among multiple frame images making up the image signals generated by the signal processing circuit 203. The information of motion vectors detected in this way is transmitted to the lens microprocessor 111 via the first communication channel, as a part of control commands regarding image stabilization operations, and is reflected in image stabilization processing.

The camera microprocessor 205 serving as a camera control unit controls the camera body 200 in accordance with input from a camera operating unit 207 that includes an imaging instruction switch that is omitted from illustration, and various types of settings switches and so forth. The camera microprocessor 205 communicates with the lens microprocessor 111 via a first camera communication unit 208a serving as a first camera communication control unit, and a second camera communication unit 208b serving as a second camera communication unit. In FIG. 1, The first camera communication unit 208a is written as "first camera communication unit", and the second camera communication unit 208b is written as "second camera communication unit". The first camera communication unit 208a forms the above-described first communication channel with the lens microprocessor 111, and the second camera communication unit 208b forms the above-described second communication channel with the lens microprocessor 111.

The camera microprocessor 205 transmits control commands regarding zoom operations in accordance with operations of a zoom switch that is omitted from illustration, to the lens microprocessor 111 from the first camera communication unit 208a via the first communication channel. In the same way, the camera microprocessor 205 transmits control commands regarding focus operations in accordance with light amount adjustment operations of the aperture unit 114 according to luminance information and focus operations of the focus lens 104 according to focus information, to the lens microprocessor 111 via the first communication channel. The camera microprocessor 205 controls communication with the lens microprocessor 111 following a communication control program that is a computer program.

Next, the configuration of the first and second communication channels provided between the camera microprocessor 205 and lens microprocessor 111 will be described in detail, with reference to FIG. 2. The aforementioned mount 300 is provided with communication terminal portions 301 through 304. The first camera communication unit 208a is connected to three communication terminal portions 301 through 303 via a first camera communication interface circuit 208c. The first lens communication unit 112a is connected to the communication terminal portions 301 through 303 via a first lens communication interface circuit 112c. Accordingly, this forms the first communication channel made up of three lines (three communication lines). The first communication channel performs communication by a communication method realized by three lines, such as three-line clock synchronous communication and asynchronous communication (using at least two lines). In the following, the first communication channel performs three-line clock synchronous communication.

The second camera communication unit 208b is connected to one communication terminal portion 304 via a second camera communication interface circuit 208d. The second lens communication unit 112b is connected to the communication terminal portion 304 via the second lens interface circuit 112d. Accordingly, this forms the second communication channel made up of one line (one communication line). The second communication channel performs communication by a communication method realized by on line. In the following, the second communication channel performs asynchronous communication.

The first communication channel is made up of a clock communication line (LCLK) serving as a first communication line, a camera-lens communication line (DCL) serving as a second communication line, and a first lens-camera communication line (DLC) serving as a third communication line. The clock communication line is a communication line that supplies clock signals, serving as timing signals for obtaining data from the camera microprocessor 205 that is the communication master for the lens microprocessor 111. Communication by the camera-lens communication line (DCL) and communication by the first lens-camera communication line (DLC) are each performed at timings corresponding to these clock signals. This, the clock signals are signals that control timing for communication by the camera-lens communication line (DCL) and communication by the first lens-camera communication line (DLC).

The camera-lens communication line is a communication line for transmitting various types of commands, such as the above-described control commands and data specification commands (including requests) from the camera microprocessor 205 to the lens microprocessor 111. The first lens-camera communication line is a communication line for transmitting various types of notifications, such as responses as to the various types of commands that the lens microprocessor 111 has received from the camera microprocessor 205, and so forth, to the camera microprocessor 205.

The various types of commands transmitted from the camera microprocessor 205 to the lens microprocessor 111 also include rate specification commands. In order to asynchronous communication to be established on the second communication channel, the communication speed (communication bitrate) for performing communication between the camera microprocessor 205 and lens microprocessor 111 needs to be agreed on beforehand, and communication needs to be performed following this agreement. In the present embodiment, the communication bitrate is shared between the camera microprocessor 205 and lens microprocessor 111 as an agreement, by the camera microprocessor 205 transmitting (instructing) a rate specification command serving as a command specifying this communication bitrate to the lens microprocessor 111. The communication bitrate indicates the amount of data that can be transferred per second, and the unit thereof is bps (bits per second).

Various types of notifications transmitted from the lens microprocessor 111 to the camera microprocessor 205 include responses indicating reception of control commands and the driving state of actuators driven in accordance with the control commands, and notification bitrates that can be realized on the second communication channel. In a case where a communication abnormality has occurred on the second communication channel, an abnormality notification to the camera microprocessor 205 is also included.

The second communication channel is configured of a single second lens-camera communication line (DLC2) serving as a fourth communication line. This second lens-camera communication line is a channel for transmitting the above-described optical data of the interchangeable lens 100 from the lens microprocessor 111 to the camera microprocessor 205. Although the second communication channel is configured of only one second lens-camera communication line in the present embodiment, the communication cannel may be configured of multiple second lens-camera communication lines. The second communication channel is configured of only one second lens-camera communication line in the present embodiment in order to maximally reduce the number of communication terminal portions provided to the mount 300 and prevent the mount 300 from becoming large.

The lens microprocessor 111 serves as a communication master to control timing of the communication performed at the second communication channel, and communication can be performed at a timing not dependent on the timing of communication by the first communication channel. More specifically, communication by the second lens-camera communication line can be performed at a timing regardless of timings corresponding to clock signals transmitted from the camera microprocessor 205 to the lens microprocessor 111 via the clock communication line.

Note that in the present embodiment, the lens microprocessor 111 and camera microprocessor 205 perform communication via the first communication channel and communication via the second communication channel, in parallel. In this case, information that the lens microprocessor 111 transmits via the second communication channel is different information from information transmitted via the first communication channel. In other words, the lens microprocessor 111 transmits data, other that data transmitted via the first communication channel, via the second communication channel.

The camera body 200 according to the present embodiment can also mount interchangeable lenses that have communication functions via the first communication channel but do not have communication functions via the second communication channel. In this case, the camera microprocessor 205 and interchangeable lens perform transmission/reception of various types of commands from the camera microprocessor 205 to the interchangeable lens, and transmission/reception of the above-described responses to the camera microprocessor 205 and optical data, via only the first communication channel.

Figure 3:
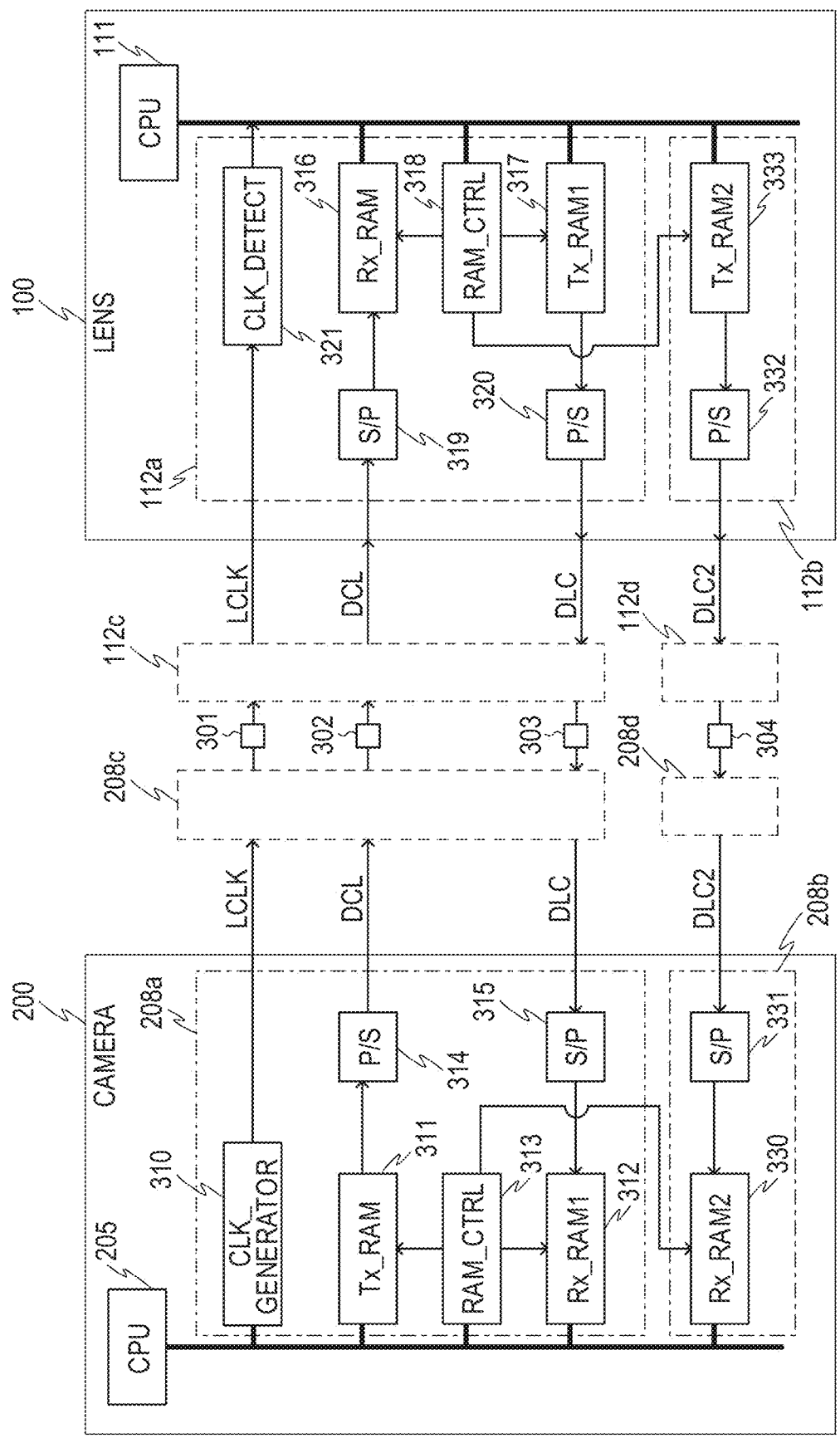
FIG. 3 is a diagram illustrating communication blocks of the camera body and interchangeable lens according to one or more aspects of the present disclosure.

FIG. 3 illustrates the configuration of the first and second camera communication units 208a and 208b, and the first and second lens communication units 112a and 112b, in further detail. In the first camera communication unit 208a, a clock generator (CLK_GENERATOR) 310 generates the above-described clock signals, and outputs to the clock channel (LCLK) of the first communication channel. A transmission data buffer (Tx_RAM) 311 is memory storing various types of commands, such as control commands to be transmitted to the lens microprocessor 111 via the camera-lens communication channel (DCL) of the first communication channel, and is made up of random access memory (RAM) or the like. A transmission parallel/serial converter 314 convers various types of commands, stored in the transmission data buffer 311 as parallel data, into serial data and outputs to the camera-lens communication channel (DCL).

A reception serial/parallel converter 315 converts notifications transmitted as serial data from the lens microprocessor 111 via the first lens-camera communication line (DLC) of the first communication channel into parallel data. A reception data buffer (Rx_RAM1) 312 is memory storing notifications as parallel data from the reception serial/parallel converter 315, and is made up of RAM or the like.

A camera buffer control unit (RAM_CTRL) 313 controls the transmission data buffer 311 and the reception data buffer 312 of the first camera communication unit 208a, and also controls a data reception buffer (Rx_RAM2) 330 of the second camera communication unit 208b. In the second camera communication unit 208b, a reception serial/parallel converter 331 converts optical data that is serial data transmitted from the lens microprocessor 111 via the second lens-camera communication channel (DLC2) of the second communication channel, into parallel data. The data reception buffer (Rx_RAM2) 330 is memory that stores optical data that is parallel data from the reception serial/parallel converter 331, and is made up of RAM or the like.

In the first lens communication unit 112a, a clock detection unit (CLK_DETECT) 321 detects clock signals input via the clock communication line of the first communication channel. A reception serial/parallel converter 319 converts various types of commands that are serial data, transmitted from the camera microprocessor 205 via the camera-lens communication line (DCL) of the first communication channel, into parallel data. A reception data buffer (Rx_RAM) 316 is memory that stores various types of commands that are parallel data from the reception serial/parallel converter 319, and is made up of RAM or the like. A transmission data buffer (Tx_RAM) 317 is memory that stores notifications to be transmitted to the camera microprocessor 205 via the camera-lens communication line (DCL) of the first communication channel, and is made up of RAM or the like. A transmission parallel/serial converter 320 converts notifications, stored in the transmission data buffer 317 as parallel data, into serial data, and outputs to the first lens-camera communication line.

A lens buffer control unit (RAM_CTRL) 318 controls the reception data buffer 316 and transmission data buffer 317 of the first lens communication unit 112a, and also control a data transmission buffer (Tx_RAM2) 333 of the second lens communication unit 112b.

In the second lens communication unit 112b, a transmission data buffer control unit (Tx_RAM2) 333 is memory that stores optical data to be transmitted to the camera microprocessor 205 via the second lens-camera communication line (DLC2) of the second communication channel, and is made up of RAM or the like. A transmission parallel/serial converter 332 converts optical data, stored in the data transmission buffer 333 as parallel data, into serial data, and outputs to the second lens-camera communication line (DLC2).

Data that is various types of commands transmitted from the camera microprocessor 205 to the lens microprocessor 111 over the first communication channel are first set in the transmission data buffer 311 from the camera microprocessor 205. For example, data of a control command instructing a focusing operation is made up of multiple bytes indicating focusing drive amount, focusing drive speed, and so forth, and first is written to the transmission data buffer 311 of the first camera communication unit 208a. The buffer control unit 313 causes the transmission data buffer 311 to output data to be transmitted, one byte at a time. The transmission parallel/serial converter 314 converts the output data from parallel data into serial data. The data that has been converted into serial data is then transmitted to the lens microprocessor 111 over the camera-lens communication line (DCL).

The data transmitted to the lens microprocessor 111 over the camera-lens communication line (DCL) is converted from serial data into parallel data at the reception serial/parallel converter 319 of the first lens communication unit 112a. The buffer control unit 318 stores this parallel data in the reception data buffer 316. The clock detection unit (CLK_DETECT) 321 detects clock signals output from the clock control unit 310 at the camera microprocessor 205 side when receiving the serial data, and detects reception data synchronously with this clock signal.

In a case of transmitting data as notifications from the lens microprocessor 111 to the camera microprocessor 205 via the first communication channel, first, this data is set in the transmission buffer 317 at the first lens communication unit 112a. For example, data made up of multiple bytes is written to the transmission data buffer 317, as a response indicating the drive state of the focus actuator. The buffer control unit 313 then causes the transmission data buffer 317 to output the data to be transmitted, one byte at a time, in accordance with the clock detecting unit 316 detecting clock signals. The transmission parallel/serial converter 320 converts the output data from parallel data into serial data. The data that has been converted into serial data is then transmitted to the camera microprocessor 205 over the first lens-camera communication line (DLC).

The data that has been transmitted to the camera microprocessor 205 over the first lens-camera communication line (DLC) is converted from serial data into parallel data at the reception serial/parallel converter 315 of the first camera communication unit 208a. The buffer control unit 313 stores this parallel data in the reception data buffer 312.

Thus, transmission of various types of commands, such as control commands from the camera microprocessor 205 to the lens microprocessor 111 via the first communication channel, and notification such as response to the control commands and so forth, from the lens microprocessor 111 to the camera microprocessor 205, are performed.

On the other hand, only the second lens-camera communication channel (DLC2) for one-way data communication from the lens microprocessor 111 to the camera microprocessor 205 is provided for the second communication channel. Accordingly, asynchronous communication, where the lens microprocessor 111 and camera microprocessor 205 each synchronize data by the respective internal clocks, is performed on the second communication channel. The communication format for asynchronous communication will be described later.

The lens microprocessor 111 receives from the camera microprocessor 205 a command requesting transmission of optical data and a command indicating a registration No. for identifying optical data, via the first communication channel. The lens microprocessor 11 generates the optical data requested by the camera microprocessor 205, and stores this optical data in the transmission data buffer 333 of the second lens communication unit 112b, along with the registration No. received from the camera microprocessor 205. In a case where the camera microprocessor 205 has requested multiple sets of optical data, the optical data is sequentially generated and stored in the transmission data buffer 333. Once all optical data requested by the camera microprocessor 205 is stored in the transmission data buffer 333, the buffer control unit 318 causes the transmission data buffer 333 to output the data to be transmitted, one byte at a time. The transmission parallel/serial converter 332 converts the optical data that is parallel data into serial data, and also converts into a later-described asynchronous communication format, and outputs to the second lens-camera communication line (DLC2).

The camera microprocessor 205 converts the optical data that is the received serial data at the reception serial/parallel converter 331 of the second camera communication unit 208b into parallel data, and extracts the body of the optical data from the asynchronous communication format. The buffer control unit 313 then stores the extracted optical data in the data reception buffer 330.

Thus, communication of transmission request commands for optical data from the camera microprocessor 205 to the lens microprocessor 111 via the first communication channel, and transmission of optical data from the lens microprocessor 111 to the camera microprocessor 205 via the second communication channel, is performed.

Next, the communication formats on the first communication channel and second communication channel will be described with reference to FIGS. 4A through 4B2. FIG. 4A illustrates an example of a communication format of the clock synchronous communication performed on the first communication channel. In FIG. 1A, clock signals transmitted/received at the clock communication line (LCLK), and signal waveforms of data signals transmitted/received at the camera-lens communication line (DCL) and data signals transmitted/received at the first lens-camera communication line (DLC), are illustrated in order from above. In the following description, clock signals will be referred to as clock signals LCLK signals, data signals transmitted/received on the camera-lens communication line (DCL) will be referred to as DCL signals, and data signals transmitted/received on the first lens-camera communication line (DLC) will be referred to as DLC signals. The first camera communication unit 208a outputs clock signals LCLK, and also outputs 8-bit data of B7 through B0 as DCL signals, so as to match the leading edge of the clock signals LCLK. The first lens communication unit 112a detects the clock signals LCLK, and also outputs 8-bit data of B7 through B0 as DLC signals, so as to match the leading edge of the clock signals LCLK.

The first camera communication unit 208a receives the 8-bit B7 through B0 DLC signals, so as to match the leading edge of the clock signals LCLK. The first lens communication unit 112a receives the also 8-bit B7 through B0 DCL signals, so as to match the leading edge of the clock signals LCLK. Thus, control is effected so as to perform communication between the first camera communication unit 208a and first lens communication unit 112a at timings corresponding to clock signals output from the first camera communication unit 208a via the clock communication line at the first communication channel. Accordingly, the camera microprocessor 205 and lens microprocessor 111 can exchange data over the first communication channel.

Also, the first lens communication unit 12a that has received the 8-bit of B7 through B0 DCL signals holds the clock signal LCLK at Low for a predetermined time Tbusy, and releases the Low when the predetermined time Tbusy elapses. The predetermined time Tbusy is time necessary to process the received data at the lens microprocessor 111, and the camera microprocessor 205 does not transmit data to the lens microprocessor 111 during this time. Communication of multiple bytes between the camera microprocessor 205 and lens microprocessor 111 on the first communication channel is performed by repeating communication processing according to this communication format.

FIG. 4B1 illustrates a communication format example of asynchronous communication performed over the second communication channel. An example is illustrated here where a 1-bit start bit, an 8-bit data bit, and a 1-bit stop bit, making up ten bits form one frame, as the format of data that is communicated. Note that the data bits may be seven bits or 16 bits, and a parity bit may be included. Alternatively, the stop bit may be two bits.

Figure 2:
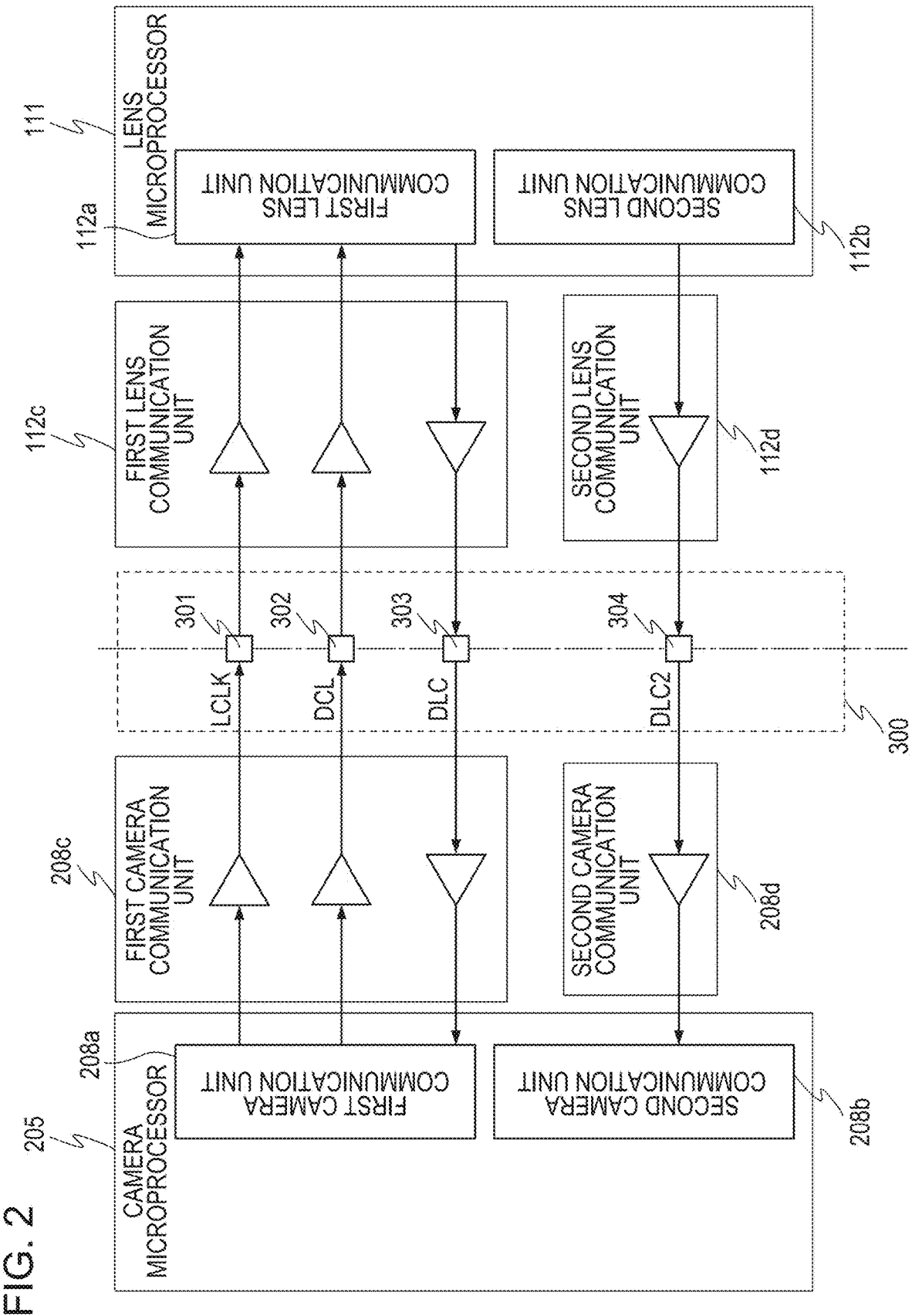
FIG. 2 is a diagram illustrating a mount configuration between the camera body and interchangeable lens according to one or more aspects of the present disclosure.

FIG. 4B2 illustrates a timing synchronization method in the asynchronous communication over the second communication channel. The camera microprocessor 205 and lens microprocessor 111 transmit/receive data by operating internal clocks according to a clock frequency, i.e., clock rate, that both have agreed on. For example, the internal clock is set to a clock rate that is 16 times the communication rate between the camera microprocessor 205 and lens microprocessor 111. The start point of data sampling is decided to be sampling at the internal clock of the trailing edge of the start bit in the received data, so that this can be shown as synchronization timing in FIG. 4B2. This data at the position of eight clocks starting at this synchronization timing is latched, so that this can be shown as data sampling timing in FIG. 4B2. Accordingly, data can be read at the middle of each bit. Performing data sampling in this way for each bit enables data communication to be performed over only the one second lens-camera communication line (DLC2).

Figure 11:
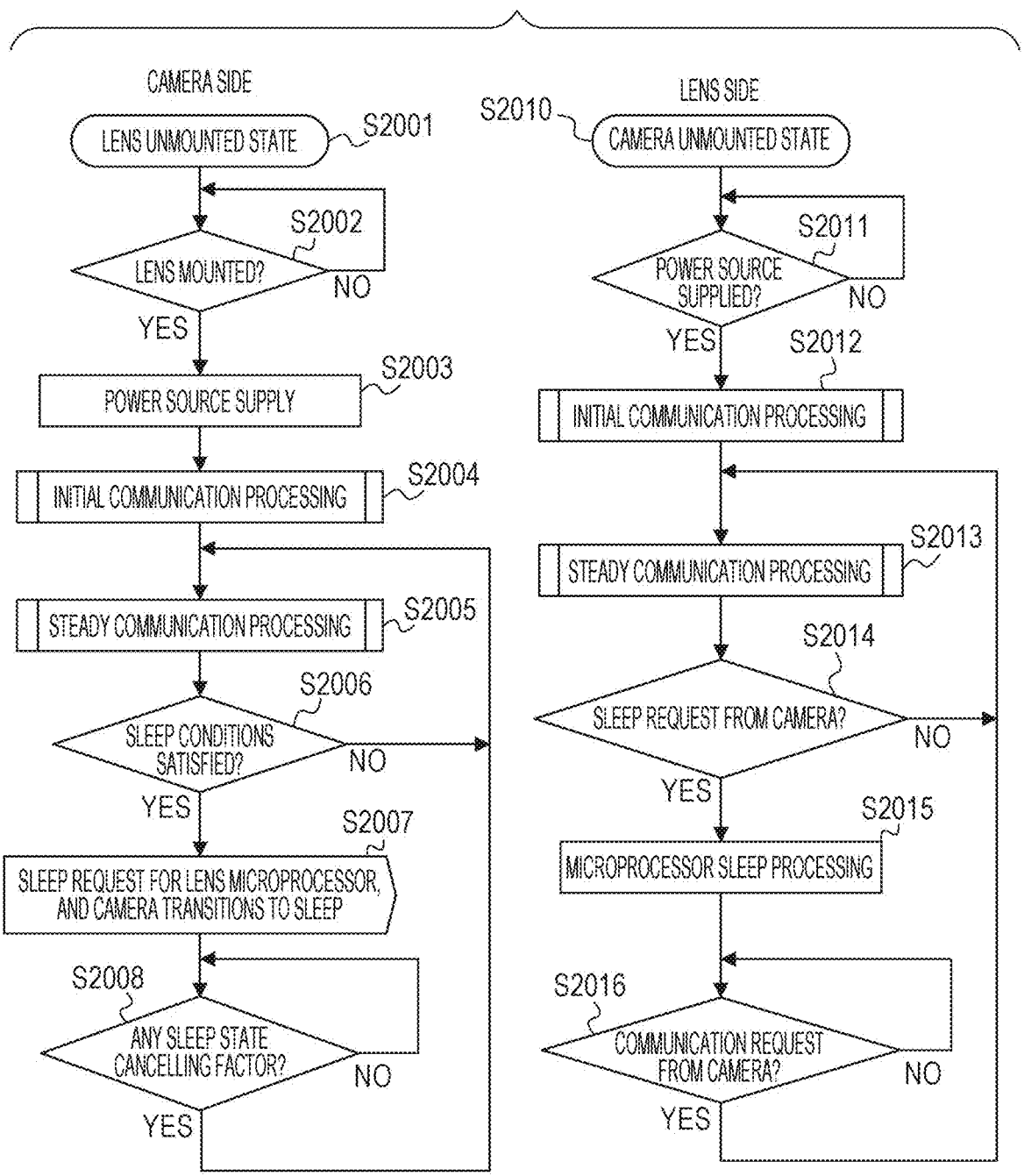
FIG. 11 is a flowchart illustrating overall processing of the camera microprocessor and a lens microprocessor according to one or more aspects of the present disclosure.

The flowchart in FIG. 11 illustrates the flow of processing that the camera microprocessor 205 and lens microprocessor 111 perform. S in FIG. 11 means "step".

First, the processing that the camera microprocessor 205 performs will be described. The camera microprocessor 205 starts processing from a state where the interchangeable lens 100 has not been mounted to the camera body 200, in step S2001. In S2002, the camera microprocessor 205 determines whether or not the interchangeable lens 100 has been mounted to the camera body 200, and if mounted, the flow advances to S2003.

In S2003, the camera microprocessor 205 starts supply of power source to the interchangeable lens 100. Accordingly, the lens microprocessor 111 and the actuators in the interchangeable lens 100 can operate.

Next, in S2004, the camera microprocessor 205 performs initial communication processing with the lens microprocessor 111. This initial communication processing will be described later.

Next, in S2005, the camera microprocessor 205 performs steady communication processing with the lens microprocessor 111. This steady communication processing is processing that is performed when the camera body 200 is performing steady operations (live view display, etc.), and will be described in detail later.

Next, in S2006, the camera microprocessor 205 determines whether or not conditions are satisfied for sleep processing. For example, determination is made regarding whether or not an auto power off time that the user has set has elapsed. If the conditions are satisfied, the flow advances to S2007, otherwise, the flow returns to S2005.

In S2007, the camera microprocessor 205 performs communication (sleep request) to transition the lens microprocessor 111 to a sleep state, and the camera microprocessor 205 itself also transitions to a sleep state.

Next, in S2008, the camera microprocessor 205 that is in a sleep state determines whether or not a sleep state canceling factor has occurred. For example, determination is made regarding whether or not the camera operating unit 207 has been operated. In a case where a sleep state canceling factor has occurred, the flow returns to S2005 and steady communication processing is resumed.

The processing performed at the lens microprocessor 111 will be described next. The lens microprocessor 111 starts the flow from a state where the interchangeable lens 100 is not mounted to the camera body 200 in S2010. The S2011, the lens microprocessor 111 determines whether or not power source supply from the camera body 200 has started. Once power source supply has started, the lens microprocessor 111 performs later-described initial communication processing in S2012.

Then in S2013, the lens microprocessor 111 performs the later-described initial communication processing. Further, in S2014, the lens microprocessor 111 determines whether or not a sleep request has been received from the camera microprocessor 205. In a case of having received a sleep request, in S2015 the lens microprocessor 111 performs processing to transition the lens microprocessor 111 itself to a sleep state. In a case where a sleep request has not been received, the lens microprocessor 111 returns to S2013.

In S2016, the lens microprocessor 111 in a sleep state determines whether or not there has been a communication request from the camera microprocessor 205, and in a case where there has been a communication request, the sleep state is cancelled, and the lens microprocessor 111 returns to S2013 and resumes steady communication processing.

Figure 5A:
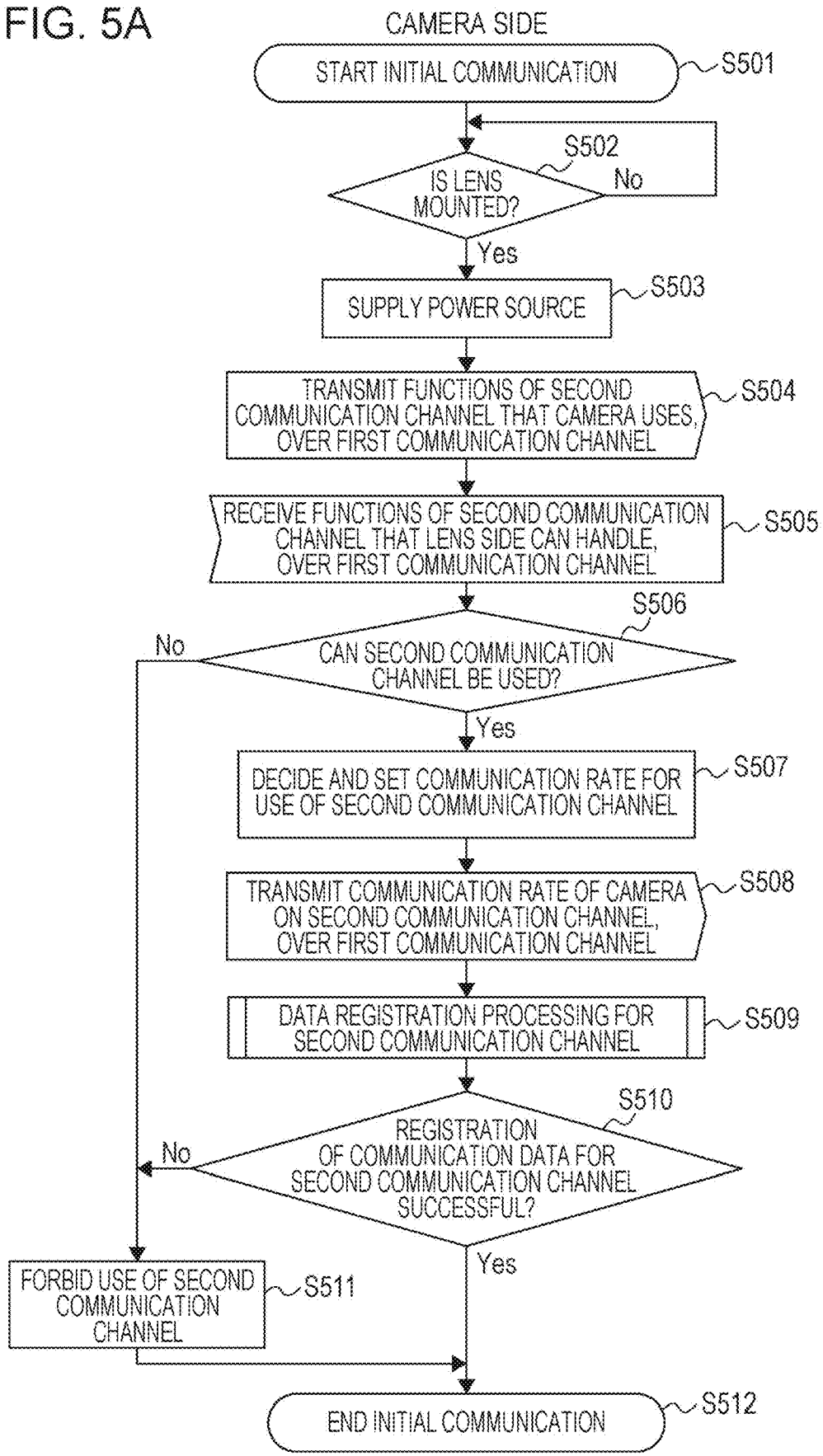
FIG. 5A is a flowchart illustrating initial communication processing that a camera microprocessor performs according to one or more aspects of the present disclosure.
Figure 5B:
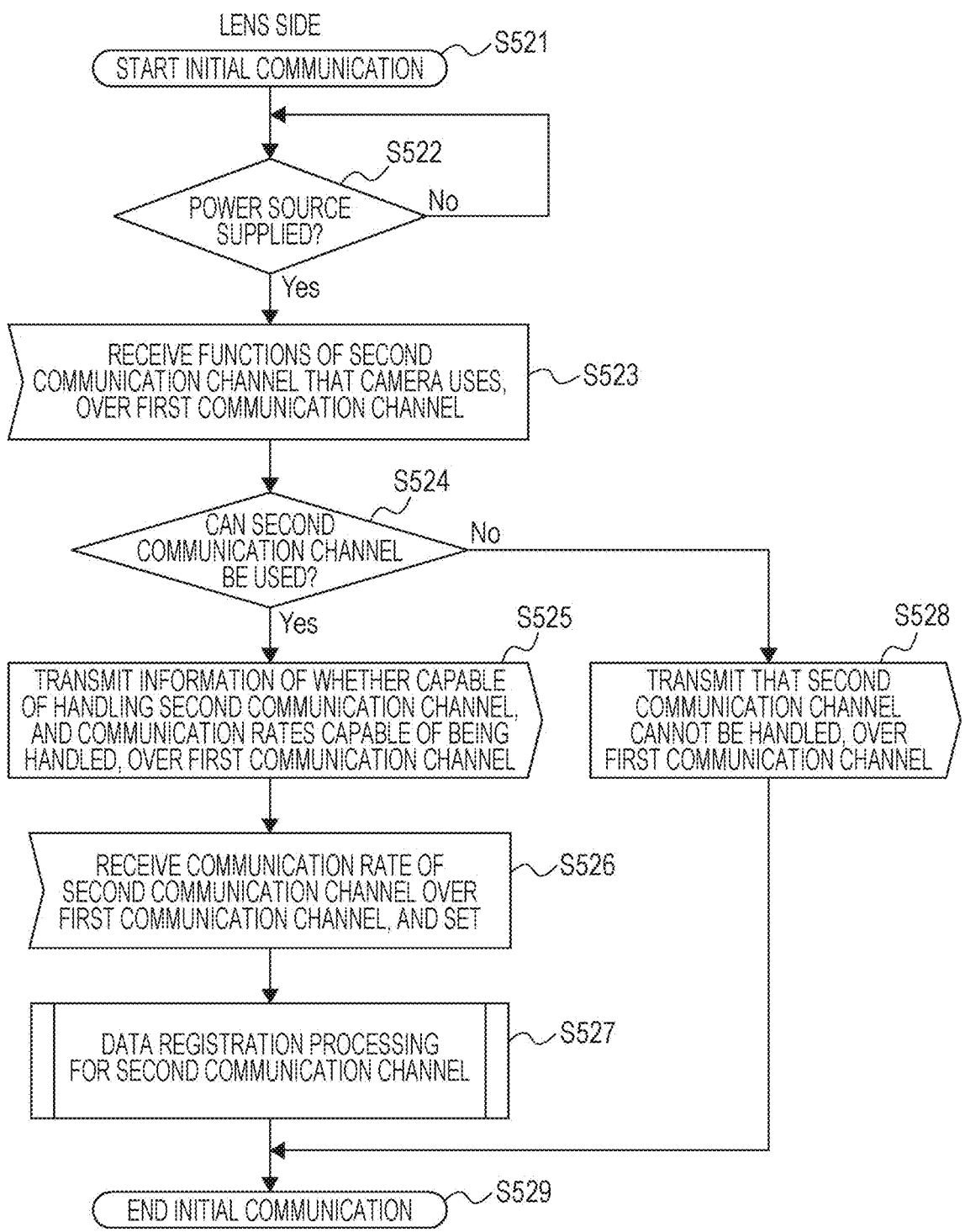
FIG. 5B is a flowchart illustrating initial communication processing that the lens microprocessor performs according to one or more aspects of the present disclosure.

Next, the flowcharts in FIGS. 5A and 5B will be used to describe the initial communication processing performed by the camera microprocessor 205 and lens microprocessor 111 in S2004 and S2012 in FIG. 11. First, the initial communication processing that the camera microprocessor 205 performs will be described with reference to the flowchart in FIG. 5A. An example of a specific command illustrated in FIG. 12 will be used for description here.

The camera microprocessor 205 that has started up in S501 determines in S502 whether or not the interchangeable lens 100 has been mounted to the camera body 200, and in a case where the interchangeable lens 100 has been mounted, advances to S503.

In S503, the camera microprocessor 205 starts power source supply to the interchangeable lens 100. This enables the camera microprocessor 205 and lens microprocessor 111 to communicate.

Next, in S504, the camera microprocessor 205 transmits a communication rate capable information command for the second communication channel (0xAA in hexadecimal) shown in FIG. 12 to the lens microprocessor 111, to notify that the camera microprocessor 205 has capabilities to use the second communication channel.

In the following description, assumption will be made that a communication rate 1 through communication rate 8 have been decided between the camera microprocessor 205 and lens microprocessor 111, corresponding to each of bit 0 through bit 7, as the communication rate definitions shown in FIG. 13. Of the communication rate 1 through communication rate 8, communication rate 1 is the slowest communication rate, and communication rate 8 is the fastest communication rate. Definition has been made such that the speed increases from communication rate 1 toward communication rate 8.

In the present embodiment, an assumption will be made that the camera microprocessor 205 handles communication rates of communication rate 1 through communication rate 5. The camera microprocessor 205 transmits communication rate information in which bit 0, bit 1, bit 2, bit 3, and bit 4, corresponding to communication rate 1, communication rate 2, communication rate 3, communication rate 4, and communication rate 5, are enabled, as communication rate information, i.e., 0x1F in hexadecimal following the communication rate capable information notification command (0xAA in hexadecimal). In a case where the camera side cannot use the second communication channel, communication rate information in which bit 0 through bit 7 has all been invalidated, i.e., 0x00 in hexadecimal is transmitted to the lens microprocessor 111 following the communication rate capable information notification command (0xAA in hexadecimal).

In S505, the camera microprocessor 205 obtains communication rate information that is usable on the second communication channel from the lens microprocessor 111. In the present embodiment, assumption will be made that the lens microprocessor 111 can handle communication rate 1, communication rate 2, and communication rate 3. In this case, the lens microprocessor 111 transmits to the camera microprocessor 205 communication rate information in which bit 0, bit 1, and bit 2, corresponding to communication rate 1, communication rate 2, and communication rate are enabled, as communication rate information, i.e., 0x07 in hexadecimal.

Next, in S506, determination is made regarding whether or not the second communication channel can be used. In the present embodiment, the camera microprocessor 205 determines whether or not the second communication channel can be used from the communication rate information obtained from the lens microprocessor 111 in S505. Specifically, in a case where no valid bit is included in the communication rate information received from the lens microprocessor 111 in S505, determination is made that the second communication channel cannot be used. Cases where the second communication channel cannot be used includes cases where the communication rates that the lens microprocessor 111 can use and the communication rates that the camera microprocessor 205 can use do not match, and cases where the lens microprocessor 111 cannot handle the second communication channel. In a case where the second communication channel can be used, the camera microprocessor 205 advances to S507, and in a case where the second communication channel cannot be used, advances to S511 and forbids use of the second communication channel, and ends the initial communication processing in S512.

Thus, determination is made regarding whether or not the second communication channel can be used based on communication rate information in the present embodiment, but other methods may be used if whether or not the second communication channel can be used can be determined. For example, identification information (e.g., information such as an ID or the like) of the interchangeable lens may be obtained when turning the power on or when mounting the interchangeable lens, and whether or not the second communication channel can be used may be determined based on the identification information.

In S507, the camera microprocessor 205 decides the usage communication rate on the second communication channel from the communication rate information obtained from the lens microprocessor 111 in S505, and sets that information in the second camera communication unit 208b.

Figure 13:
FIG. 13 is a diagram illustrating communication rate definitions according to one or more aspects of the present disclosure.

Then in S508, the camera microprocessor 205 transmits the usage communication rate that has been decided in S507 to the lens microprocessor 111 over the camera-lens communication line (DCL) of the first communication channel, in the bit expression shown in FIG. 13. The camera microprocessor 205 at this time decides the communication rate 3, which is the fastest communication rate that both the camera microprocessor 205 and the lens microprocessor 111 can use, to be the usage communication rate. The camera microprocessor 205 then transmits a usage communication rate communication command for the second communication channel (0xCC), and 0x04 representing communication rate 3, to the lens microprocessor 111.

In S509, the camera microprocessor 205 then performs data registration processing for registering a definition of optical data (hereinafter referred to as "optical data definition", described later in detail) to be transmitted to the lens microprocessor 111 over the second communication channel. The camera microprocessor 205 transmits a data registration request command to the lens microprocessor 111 in the data registration processing, thereby causing the lens microprocessor 111 to also perform data registration processing, which will be described in detail later.

Then in S510, the camera microprocessor 205 determines whether or not data registration processing has been successful in S509, and if successful, advances to S512 and completes the initial communication processing at the camera microprocessor 205. Note that in a case where determination has been made in S506 that the second communication channel cannot be used, and in a case where determination has been made in S510 that data registration processing has failed, the camera microprocessor 205 forbids usage of the second communication channel in S511, and completes the initial communication processing in S512.

Next, the initial communication processing performed at the lens microprocessor 111 in response to the initial communication processing of the camera microprocessor 205 described above will be described with reference to the flowchart in FIG. 5B.

In S521, the lens microprocessor 111 that has started the initial communication processing awaits supply of power source from the camera microprocessor 205 in S522.

In S523, the lens microprocessor 111 receives the communication rate capable information command transmitted from the camera microprocessor 205 (0xAA) and the communication rate information (0x1F) of the communication rates that the camera can use.

In S524, the lens microprocessor 111 determines whether or not the second communication channel can be used, based on the communication rate information obtained from the camera microprocessor 205 in S523 and the communication rate information that the lens microprocessor 111 can use on the second communication channel. If the second communication channel can be used, the lens microprocessor 111 advances to S525, and if not usable (the lens microprocessor 111 cannot handle the functions of the second communication channel), advances to S528. Note that determination of whether or not the second communication channel can be used may be made using identification information of the camera, for example, in the same way as in the description of S506.

In S525, the lens microprocessor 111 transmits information of communication rates that can be used on the second communication channel to the camera microprocessor 205. The lens microprocessor 111 here transmits information in which bit 0, bit 1, and bit 2, corresponding to communication rate 1, communication rate 2, and communication rate 3 are enabled, as communication rate information (0x07), to the camera microprocessor 205, as described in S505.

In S526, the lens microprocessor 111 receives the communication rate information of the second communication channel transmitted by the camera microprocessor 205 in S508, and sets this to the second lens communication unit 112b.

Further, in S527, the lens microprocessor 111 performs data registration processing for registering optical data definitions to be transmitted to the camera microprocessor 205, in response to receiving a data registration request command from the camera microprocessor 205 as described in S509. Details of this data registration processing will be described later. Thereafter, the lens microprocessor 111 advances to S529, and ends the initial communication processing.

On the other hand, in S528, the lens microprocessor 111 performs processing for a case where the second communication channel is not usable (cannot handle the second communication channel). Specifically, the lens microprocessor 111 clears all bits indicating communication rates that can be used on the second communication channel, shown in FIG. 13, and transmits 0x00 to the camera microprocessor 205 as a communication rate capable information obtaining command shown in FIG. 12. Thereafter, the lens microprocessor 111 advances to S529 and ends the initial communication processing.

Figure 5C:
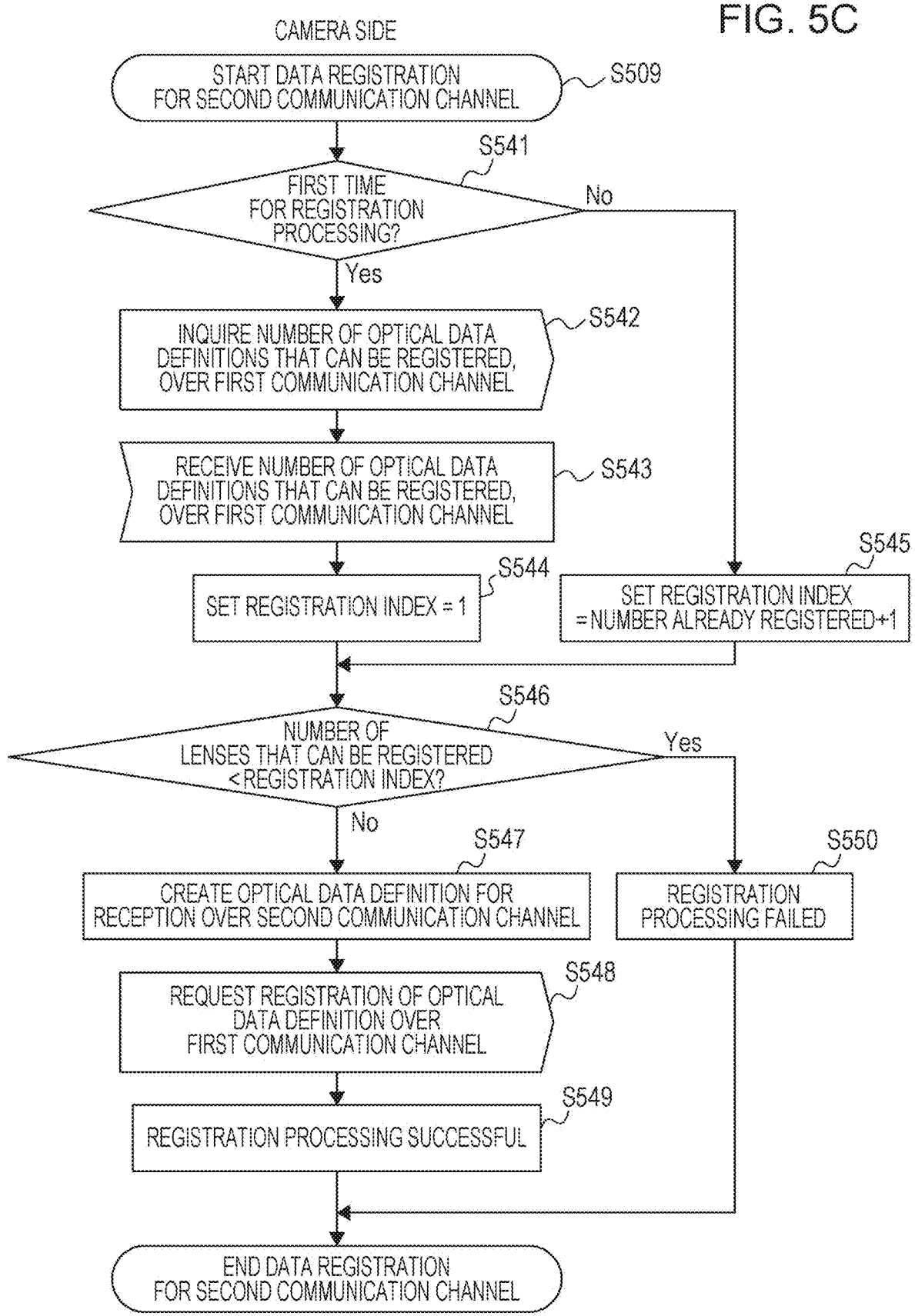
FIG. 5C is a flowchart illustrating registration data processing that the camera microprocessor performs according to one or more aspects of the present disclosure.
Figure 5D:
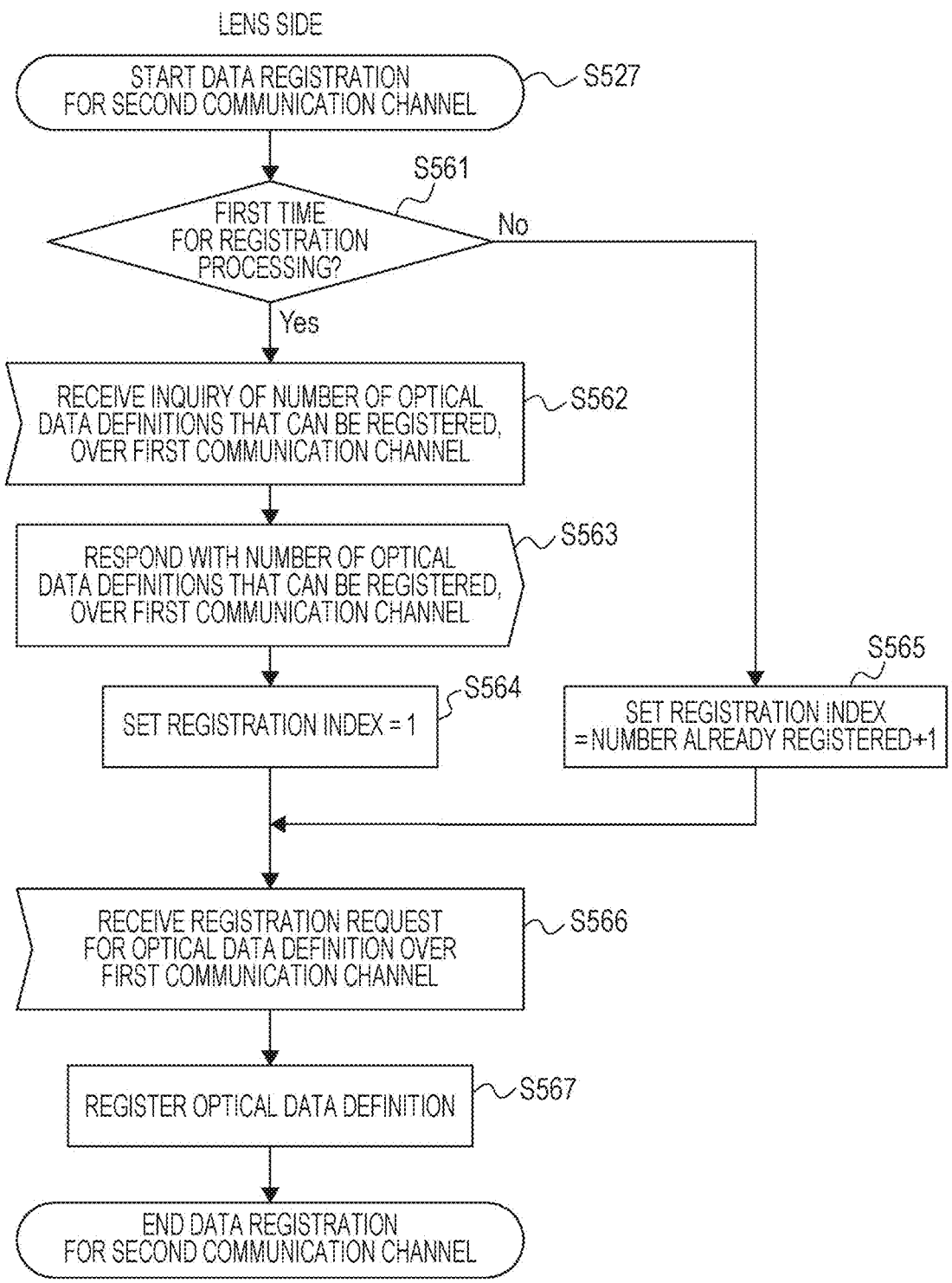
FIG. 5D is a flowchart illustrating registration data processing that the lens microprocessor performs according to one or more aspects of the present disclosure.

Next, data registration processing that the camera microprocessor 205 and lens microprocessor 111 perform in S509 and S527 respectively will be described with reference to the flowcharts in FIGS. 5C and 5D.

First, the data registration processing that the camera microprocessor 205 performs will be described with reference to the flowchart in FIG. 5C. In S541, the camera microprocessor 205 determines whether or not this is the first time of performing data registration processing for the lens microprocessor 111 of the interchangeable lens 100 that is mounted. In a case where this is the first time to perform data registration processing for the lens microprocessor 111, the camera microprocessor 205 advances to S542, and if data registration processing has already been performed, advances to S545.

In S542, the camera microprocessor 205 makes inquiry to the lens microprocessor S11 regarding the number of optical data definitions that can be registered, via the first communication channel. In S543, the camera microprocessor 205 obtains the number that can be registered, as a reply from the lens microprocessor 111.

Next, in S544, the camera microprocessor 205 sets a registration index to "1". On the other hand, in S545, the registration index is set to "number already registered+1".

Next, in S546, the camera microprocessor 205 determines whether or not the number set in the registration index exceeds the number that can be registered, obtained in S543. In a case where the number set in the registration index exceeds the number that can be registered, the camera microprocessor 205 advances to S550 where data registration processing is determined to have failed, and ends the data registration processing. In a case where the number set in the registration index does not exceed the number that can be registered, the camera microprocessor 205 advances to S547.

In S547, the camera microprocessor 205 creates an optical data definition indicating the type and transmission order of optical data that is to be transmitted from the lens microprocessor 111 over the second communication channel. Specifically, an optical data definition is created by correlating a registration No. of the optical data definition, the type of optical data, and the transmission order, as illustrated in FIG. 14. Information that has been registered in order for optical data to be transmitted from the lens microprocessor 111 is also referred to as "registration information", with type and transmission order of optical data being examples of registration information.

For example, correlated with registration No. 1 are optical data "focal length information (2)", "aperture diameter information (3)", "focus position information (2)", "zoom position information (2)", "gyro information (20)", and "focus correction information (100)", in this transmission order. Correlated with registration No. 2 are "focus position information (2)" and "focus correction information (100)", in this transmission order. Correlated with registration No. 3 are "focal length information (2)", "aperture diameter information (3)", "zoom position information (2)", and "current aperture position information (3)", in this transmission order. Correlated with registration No. 4 are "gyro information (20)" and "tripod fixation determination information (1)", in this transmission order. Note that the values in the parentheses for each kind of information indicate the data length (bytes) for expressing the information thereof. Note that these optical data definitions are examples, and may include other optical data (information).

In a case where the combination of optical data correlated differs between one registration No. and another registration No., for example, part of the correlated optical data may overlap. Also, there may be cases where the combinations of correlated optical data are the same, but the order of correlation differs, for example. That is to say, it is sufficient for at least one of the combination of correlated optical data and the order to differ between one registration No. and another registration No.

In S548, the camera microprocessor 205 transmits an optical data definition created in S547, along with the data registration request command, to the lens microprocessor 111 via the first communication channel. The communication processing at this time will be described with reference to FIG. 6.

FIG. 6 illustrates signal waveforms of a clock signal line (LCLK) 601, camera-lens communication line (DCL) 602, and first lens-camera communication line (DLC) 603, making up the first communication channel. A case of registering N optical data definitions is illustrated here, showing registration processing 604 of a first optical data definition (No. 1), registration processing 605 of a second optical data definition (No. 2), and registration processing 606 of an N'th optical data definition (No. 3).

In the registration processing 604, the camera microprocessor 205 transmits a data registration request command (0xDD in FIG. 12) 610 to the lens microprocessor 111. Next, the camera microprocessor 205 transmits an entry No. 611 indicating the registration No. to be registered, to the lens microprocessor 111. An entry No. command "1" corresponding to the registration No. 1 is transmitted here. The camera microprocessor 205 then transmits a count command 612 indicating the number of optical data definitions that should be registered, "0x0A in a case where the number is ten, as shown in FIG. 12, for example, to the lens microprocessor 111. The camera microprocessor 205 then transmits the optical data to be included in the optical data definitions to the lens microprocessor 111 as first registration command (613) through n'th registration command (614), and finally transmits a checksum 615 to the lens microprocessor 111 to guarantee the data.

Upon receiving the data registration request command from the camera microprocessor 205, the lens microprocessor 111 transmits a response "00" to the camera microprocessor 205. Further, each time the aforementioned command is received, the lens microprocessor 111 transmits responses "Ack" 616 and 617 to the camera microprocessor 205, for confirmation of the reception. Finally, the lens microprocessor 111 receives the checksum 615 from the camera microprocessor 205, and thus transmits a response for confirmation thereof to the camera microprocessor 205. The registration processing described above is performed for all optical data definitions (No. 1 through No. N).

The camera microprocessor 205 that has performed the data registration request processing in S548 by the above-described processing advances to S549 and determines the data registration processing to have been successful, and ends this processing.

Next, the data registration processing performed by the lens microprocessor 111 will be described with reference to the flowchart in FIG. 5D. In S561, the lens microprocessor 111 determines whether or not this is the first time to perform data registration processing with the camera microprocessor 205, and advances to S562 if the first time, and to S565 if data registration processing has already been performed.

In S562, the lens microprocessor 111 receives an inquiry from the camera microprocessor 205, regarding the number of optical data definitions that can be registered. The lens microprocessor 111 responds the number that can be registered to the camera microprocessor 205 in S563. At this time, the lens microprocessor 111 decides the number that can be registered in accordance with the capacity of the storage area storing optical data, such as RAM or the like within the interchangeable lens 100.

Next, in S564, the lens microprocessor 111 sets the registration index for finalizing an address in the storage region to "1". On the other hand, in S565, the registration index is set to "number already registered+1".

Next, in S566, the lens microprocessor 111 receives the data registration request command that the camera microprocessor 205 has transmitted in S548.

Next, in S567, the lens microprocessor 111 stores the optical data corresponding to registration commands 1 through n transmitted from the camera microprocessor 205, to addresses in the storage region offset in accordance with the registration index, with the head address as a reference. This processing ends the data registration processing for the lens microprocessor 111.

Figure 7:
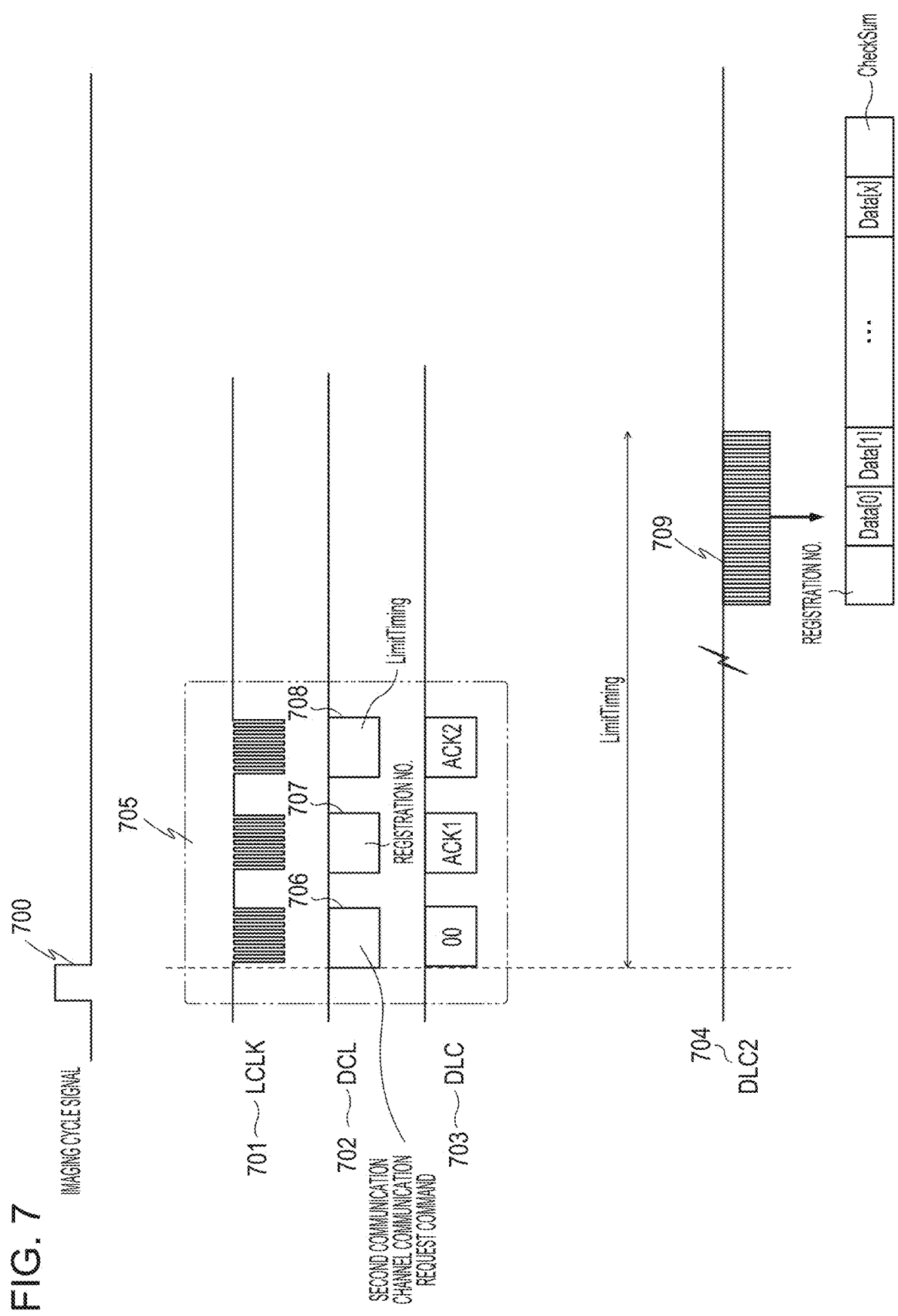
FIG. 7 is a diagram illustrating communication processing that the camera microprocessor performs over a second communication channel according to one or more aspects of the present disclosure.

Next, communication processing performed when the camera microprocessor 205 and lens microprocessor 111 communicate over the second communication channel will be described. FIG. 7 illustrates signal waveforms of a clock signal line (LCLK) 701, camera-lens communication line (DCL) 702, and first lens-camera communication channel (DLC) 703, making up the first communication channel. Also illustrated is the signal waveforms on the second lens-camera communication line (DLC2) 704 making up the second communication channel.

A case will be described here regarding performing communication over the second communication channel at an imaging start timing 700 for live view images or shooting moving images. Note however, that communication may be made over the second communication channel in cases of performing imaging other than live view images or shooting moving images.

The camera microprocessor 205 is triggered by the imaging start timing 700, and performs second communication channel request processing 705 over the first communication channel, to request the lens microprocessor 111 for communication over the second communication channel. The camera microprocessor 205 transmits a second communication channel communication request command (0xE0 in FIG. 12) 706, requesting communication over the second communication channel, to the lens microprocessor 111 in this second communication channel request processing 705. Subsequently, the camera microprocessor 205 transmits a registration No. command (e.g., 0x01 indicating registration No. 1) 707 indicating the registration No. of the optical data definition corresponding to the optical data regarding which transmission over the second communication channel is to be requested, and a LimitTiming command 708, to the lens microprocessor 111. The registration No. command 707 is equivalent to a data specification command and registration specification command. The LimitTiming command 708 is equivalent to a limit time command.

The LimitTiming command 708 is time that the camera microprocessor 205 specifies, and indicates a limit time by which the lens microprocessor 111 should perform transmission of optical data over the second communication channel. The lens microprocessor 111 must perform transmission of optical data to the camera microprocessor 205 within the limit time LimitTiming specified in the LimitTiming command 708, starting from the time of having received the second communication channel communication request command 706. For example, in a case where the LimitTiming command 708 is 0x64 such as illustrated in FIG. 12, the lens microprocessor 111 performs communication over the second communication channel before the limit time of 100 ms elapses after having received the second communication channel communication request command 706. Note that an arrangement may be made where, in a case of 0 ms being specified in the LimitTiming command, no limit time is set for execution of communication over the second communication channel.

Upon having received the second communication channel communication request command 706, registration No. command 707, and LimitTiming command 708, the lens microprocessor 111 transmits "00", "ACK1", and "ACK2" to the camera microprocessor 205 as responses thereto.

The lens microprocessor 111 that has received the registration No. command 707 performs communication processing over the second communication channel before the limit time LimitTiming elapses. Specifically, the lens microprocessor 111 transmits optical data 709 correlated with a registration No. to the camera microprocessor 205 in the registered transmission order, along with a response (registration No.) confirming the registration No. indicated in the registration No. command 707. Transmitting optical data including the response for confirming the registration No. (e.g., the same No. as the registration No. shown in the registration No. command 707) enables the camera microprocessor 205 to confirm that the optical data specified in the registration No. command 707 is being received.

Figure 8A:
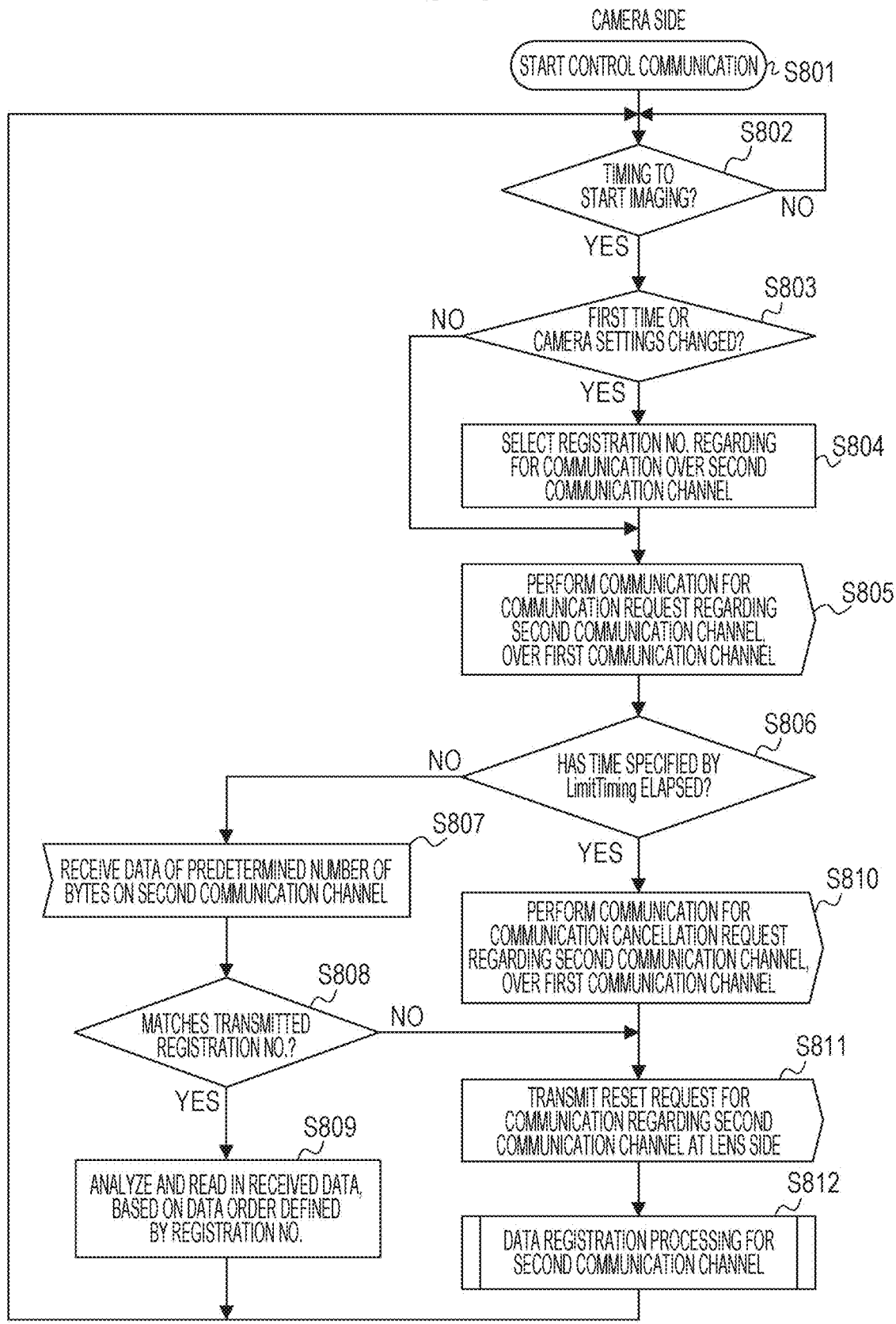
FIG. 8A is a flowchart illustrating communication processing that the camera microprocessor performs over the second communication channel according to one or more aspects of the present disclosure.
Figure 8B:
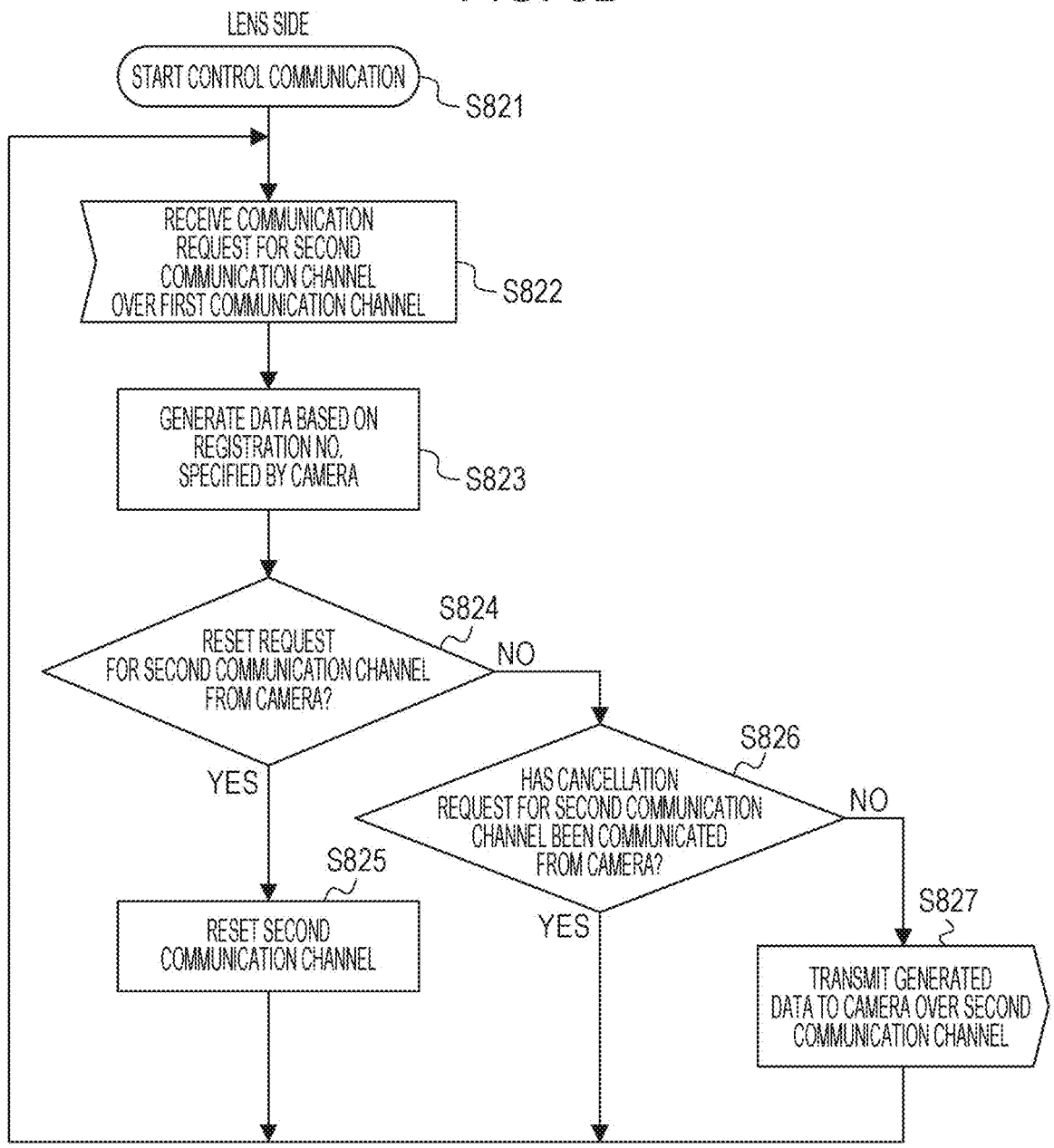
FIG. 8B is a flowchart illustrating communication processing that the lens microprocessor performs over the second communication channel according to one or more aspects of the present disclosure.

Next, communication processing performed by each of the camera microprocessor 205 and lens microprocessor 111 in the communication shown in FIG. 7 will be described with reference to the flowcharts in FIGS. 8A and 8B. First, the communication processing that the camera microprocessor 205 performs will be described with reference to FIG. 8A.

The camera microprocessor 205 starts communication processing for control (control communication) in S801. Next, in S802, the camera microprocessor 205 detects a start timing interruption of imaging control, ant is an internal signal thereof. Note that a case is exemplified here where communication control is started with the start timing interruption for imaging control as a trigger, but a start timing interruption of other control may be used as a trigger.

Next, in S803, the camera microprocessor 205 determines whether or not this is the first time to perform communication using the second communication channel, and whether or not settings of the camera body 200 (camera settings) have been changed. In a case of performing communication using the second communication channel for the first time, in S804 the camera microprocessor 205 selects an optical data definition (i.e., registration No.) corresponding to the optical data regarding which the lens microprocessor 111 is to be requested to transmit, out of the multiple registered optical data definitions shown in FIG. 14.

Also, in a case where the camera settings have been changed, the registration No. corresponding to the optical data regarding which the lens microprocessor 111 is to be requested to transmit, is re-selected. For example, in a case where the imaging cycle (framerate) of the camera body 200 has been changed, there will be an increase or decrease in the time over which communication processing can be performed over the second communication channel depending on this framerate, so there are cases where it is better to change the optical data to be communicated over the second communication channel. Another reason is that, in a case where AF processing, automatic exposure (AE) processing, and image stabilization processing settings have been changed, as camera settings, there is a possibility that the content of the optical data that should be obtained over the second communication channel will change.

Next, in S805, the camera microprocessor 205 transmits the second communication channel communication request command 706, registration No. command 707, and LimitTiming command 708, shown in FIG. 7, to the lens microprocessor 111 via the first communication channel.

Next, in S806, the camera microprocessor 205 determines whether or not the limit time instructed to the lens microprocessor 111 in the LimitTiming command 708 has elapsed. In a case where the limit time has elapsed, the camera microprocessor 205 advances to S810, and in a case where reception of the optical data from the lens microprocessor 111 via the second communication channel has been confirmed in S807 before the limit time elapses, advances to S808. Judgement of reception of the optical data is performed by having detected the start bit serving as reception data in the communication waveforms illustrated in FIG. 4B2, for example.

In S808, the camera microprocessor 205 confirms whether or not the registration No. included in the optical data 709, shown in FIG. 7, that has been received in S807, matches the registration No. indicated by the registration No. command transmitted to the lens microprocessor 111 in S805. If the registration No. matches, the camera microprocessor 205 advances to S809, and if not matching, advances to S811.

In S809, the camera microprocessor 205 analyzes and holds the optical data transmitted from the lens microprocessor 111 via the second communication channel in the transmission order in optical data definitions shown in FIG. 14 for each registration No. That is to say, in a case where the registration No. is 1, two bytes of data, which are Data[0] and Data[1] are saved as focal length information, and the following three bytes of Data[2], Data[3], and Data[4] are saved as aperture diameter information. Subsequently, data analysis and holding is performed in the same way to off-focus correction information. Thereafter, the camera microprocessor 205 returns to S802.

In S810, the camera microprocessor 205 transmits a communication cancellation request command (the 0xE1 shown in FIG. 12) to the lens microprocessor 111, to request cancellation of communication over the second communication channel. The flow then advances to S811.

In S811, the camera microprocessor 205 transmits a communication reset request command requesting resetting of the second communication channel, to the lens microprocessor 111 via the first communication channel. This is because there is a possibility that there has been a problem in data registration processing as to the second communication channel at the lens microprocessor 111, in a case where the limit time has run over in S809 or there has been a mismatch in registration Nos. in S808. The reason that the camera microprocessor 205 requests the lens microprocessor 111 to reset the second communication channel is as follows. That is to say, the second communication channel is a channel that only transmits data from the lens microprocessor 111 to the camera microprocessor 205, so the lens microprocessor 111 has no way to confirm communication abnormalities due to noise and the like.

Next, in S812, there is a possibility that there has been a problem in data registration processing requested to the lens microprocessor 111, so the camera microprocessor 205 requests the lens microprocessor 111 to perform data registration processing at the second communication channel again. The data registration processing is the same processing as the processing in S509, i.e., the same processing as that described in FIG. 5C, so description will be omitted here. The camera microprocessor 205 then returns to S802.

Next, the communication processing that the lens microprocessor 111 performs will be described with reference to FIG. 8B. In S821, the lens microprocessor 111 starts control communication. Then in S822, the lens microprocessor 111 receives the second communication channel communication request command 706, registration No. command 707, and LimitTiming command 708, transmitted by the camera microprocessor 205 in S805. In a case where the registration No. command 707 received at this time indicates a registration No. that is unregistered at the lens microprocessor 111, the probability that the registration No. command 707 is not being exchanged correctly, due to communication disturbance such as noise or the like, is high. Accordingly, the lens microprocessor 111 responds with a communication abnormality to the camera microprocessor 205.

Upon confirming the response of a communication abnormality state from the lens microprocessor 111, the camera microprocessor 205 communicates a communication logic reset request command for the second communication channel (0x99 in hexadecimal) shown in FIG. 12. Upon receiving the communication logic reset request command, the lens microprocessor 111 initializes (resets) the communication logic circuit of the second communication channel.

Next, in S823, the lens microprocessor 111 generates optical data to be transmitted, in accordance with the type of optical data and the transmission order corresponding to the registration No. received in S822.

Next, in S824, the lens microprocessor 111 determines whether or not a communication reset request command transmitted from the camera microprocessor 205 has been received via the first communication channel. The lens microprocessor 111 that has received the communication reset request command resets the second communication channel within the lens microprocessor 111 in S825, and returns to S822.

The lens microprocessor 111 also determines in S826 whether or not a communication channel request command transmitted from the camera microprocessor 205 has been received. The lens microprocessor 111 that has received the communication channel request command cancels communication over the second communication channel and returns to S822. If no communication channel request command has been received, the lens microprocessor 111 advances to S827, and transmits the optical data generated in S823 to the camera microprocessor 205 via the second communication channel, and returns to S822.

As described above, in the present embodiment, transmission of commands such as control commands with a high priority level (real-time properties) from the camera microprocessor 205 to the lens microprocessor 111, and transmission of notifications such as responses as to the commands from the lens microprocessor 111, are performed over the first communication channel. The optical data from the interchangeable lens 100 that the camera microprocessor 205 needs is received via the second communication channel that is different from the first communication channel. At this time, the first camera communication unit 208a in the camera microprocessor 205 can transmit the commands to the lens microprocessor 111 regardless of whether the second camera communication unit 208b is receiving optical data. In other words, the first lens communication unit 112a of the lens microprocessor 111 can receive the commands from the camera microprocessor 205 regardless of whether the second lens communication unit 112b is transmitting optical data. Accordingly, even in cases where great amounts of optical data are to be received at the camera microprocessor 205 from the lens microprocessor 111, delay of operations corresponding to control commands, such as zooming, light amount adjustment, focusing, and image stabilization, and so forth at the interchangeable lens 100, can be reduced.

Second Embodiment

In the method described in the first embodiment, where optical data is communicated from the lens microprocessor 111 to the camera microprocessor 205 via the second communication channel, the camera microprocessor 205 can only specify a registration No. corresponding to one optical data definition per one second communication channel communication request processing. There are cases where handling is difficult with this method in cases where the control cycles of various operations differ at the camera body 200. For example, a case is where AF processing for controlling focusing operations uses the imaging cycle as a control cycle, but AE processing for controlling light amount adjustment operations uses P times worth the imaging cycle as the control cycle.

In this case, the optical data communication for AF processing and the optical data communication for AE processing are separated, with the second communication channel being used differently in accordance with the control cycles of each. Accordingly, communication processing where multiple registration Nos. can be specified for one second communication channel communication request processing will be described in the present embodiment. Note that the configuration of the camera body 200 and interchangeable lens 100 in the present embodiment is the same as the configuration of the first embodiment illustrated in FIGS. 1 through 6.

Figure 15:
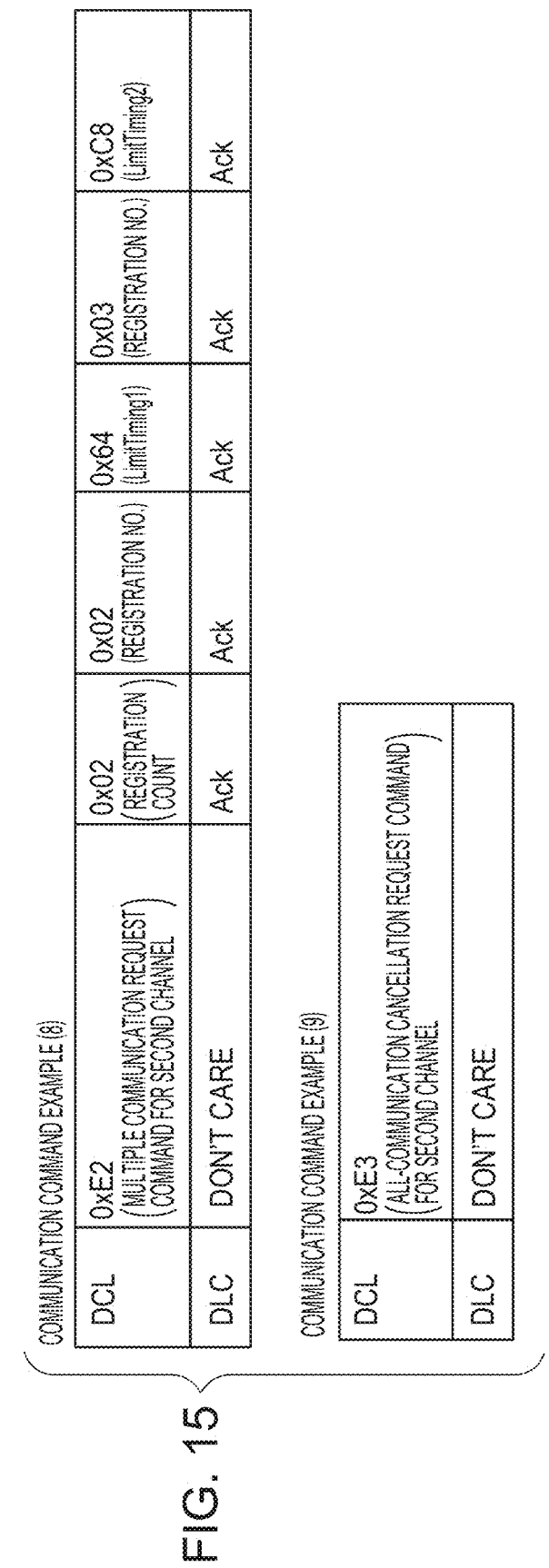
FIG. 15 is a diagram illustrating examples of communication commands according to one or more aspects of the present disclosure.

First, communication processing performed when the camera microprocessor 205 and lens microprocessor 111 communicate over the second communication channel will be described with reference to FIG. 9. FIG. 9 illustrates signal waveforms of a clock signal line (LCLK) 701, camera-lens communication line (DCL) 702, and first lens-camera communication line (DLC) 703, making up the first communication channel. Also illustrated are the signal waveforms on the second lens-camera communication line (DLC2) 704 making up the second communication channel. Here, a case where optical data communication for AF processing and optical data communication for AE processing are performed at the second communication channel will be described, using an example of specific commands shown in FIG. 15.

The camera microprocessor 205 is triggered by the imaging start timing 700, and performs second communication request processing 901 over the first communication channel, to request the lens microprocessor 111 for communication of optical data over the second communication channel. The camera microprocessor 205 transmits a second channel multiple communication request command (0xE2 in FIG. 15) 902, requesting communication of optical data corresponding to multiple optical data definitions over the second communication channel, to the lens microprocessor 111 in this second channel communication request processing 901.

Next, the camera microprocessor 205 transmits, to the lens microprocessor 111, a registration count command 903 notifying the number of registration Nos. of multiple optical data definitions corresponding to the optical data regarding which transmission is to be requested (0x02 corresponding to the number two, in this case). Further, a registration No. command 904 specifying the first of the multiple registration Nos. (0x02 corresponding to registration No. 2 in this case) is transmitted to the lens microprocessor 111. The registration No. 2 is a registration No. of an optical data definition including focus position information, focus correction information, and so forth, that is necessary for AF processing, for example. The camera microprocessor 205 then transmits a LimitTiming1 command (e.g., 0x64 indicating 100 ms) 905 to the lens microprocessor 111, to instructing a limit time for transmitting the optical data corresponding to the first registration No. The lens microprocessor 111 must transmit optical data corresponding to the first registration No. to the camera microprocessor 205 within this limit time LimitTiming1, starting from the time of having received the second channel multiple communication request command 902.

The camera microprocessor 205 then transmits a registration No. command 906 specifying the second of the multiple registration Nos. (0x03 corresponding to registration No. 3 here) to the lens microprocessor 111. Registration No. 3 is a registration No. of an optical data definition including focus length information, current aperture position information, and so forth, that is necessary for AE processing, for example. The camera microprocessor 205 then transmits a LimitTiming2 command (e.g., 0xC8 indicating 200 ms) 907 to the lens microprocessor 111, to instructing a limit time for transmitting the optical data corresponding to the second registration No. The lens microprocessor 111 must start transmission of optical data corresponding to the second registration No. to the camera microprocessor 205 within this limit time LimitTiming2, starting from the time of having received the second channel multiple communication request command 902.

The lens microprocessor 111 that has received the second channel multiple communication request command 902, registration count command 903, registration No. commands 904 and 906, and LimitTiming1 and LimitTiming2 commands 905 and 907, transmits "00", and "ACK1" through "ACK3" to the camera microprocessor 205 as responses thereto.

The lens microprocessor 111 that has received the first registration No. command 904 performs communication processing over the second communication channel before the limit time LimitTiming1 elapses. Specifically, the lens microprocessor 111 transmits optical data 910 correlated with a registration No. to the camera microprocessor 205 in the registered transmission order, along with a response (registration No.) confirming the registration No. indicated in the first registration No. command 904 that was received.

Further, the lens microprocessor 111 that has received the second registration No. command 906 starts communication processing over the second communication channel before the limit time LimitTiming2 elapses. Specifically, the lens microprocessor 111 transmits optical data 912 correlated with a registration No. to the camera microprocessor 205 in the registered transmission order, along with a response (registration No.) confirming the registration No. indicated in the second registration No. command 906 that was received.

Note that FIG. 9 illustrates a case where, when communication over the second communication channel corresponding to the first registration No. command 904 is completed, the camera microprocessor 205 performs second channel communication request processing 920 again, at imaging start timing 700'. In the second channel communication request processing 920, the camera microprocessor 205 transmits a second channel communication request command (e.g., 0xE0) 921, a registration No. command (e.g., 0x02) 922, and a LimitTiming command (e.g., 0x64) 923, to the lens microprocessor 111. A case of requesting transmission again of the optical data corresponding to the registration No. command (0x02) 904 in the earlier second channel communication request processing 901 is illustrated here. The lens microprocessor 111 must transmit the optical within the limit time LimitTiming, starting from the time of having received the second channel communication request command 921.

The lens microprocessor 111 that has received the second channel communication request command 921, registration No. command 922, and LimitTiming command 923, transmits "00", "ACK1", and "ACK2" to the camera microprocessor 205 as responses thereto.

A communication blank time is provided between the transmission of optical data corresponding to the registration No. command 906 and the transmission of optical data corresponding to the registration No. command 921 on the second communication channel in FIG. 9. This communication blank time will be described later.

A first absolute limit time is decided when the lens microprocessor 111 receives the second channel multiple communication request command 902, and is derived from the limit time LimitTiming1 for communicating optical data corresponding to the registration No. command 904 over the second communication channel. A second absolute limit time is decided when the lens microprocessor 111 receives the second channel multiple communication request command 902, and is derived from the limit time LimitTiming2 for communicating optical data corresponding to the registration No. command 906 over the second communication channel. A third absolute limit time is decided when the lens microprocessor 111 receives the second channel communication request command 921, and is derived from the limit time LimitTiming for communicating optical data corresponding to the registration No. command 922 over the second communication channel. In the present embodiment, the lens microprocessor 111 decides which optical data corresponding to which registration No. to transmit to the camera microprocessor 205 with priority, using these absolute limit times 1 through 3. This priority determination processing will be described later.

Figure 10A:
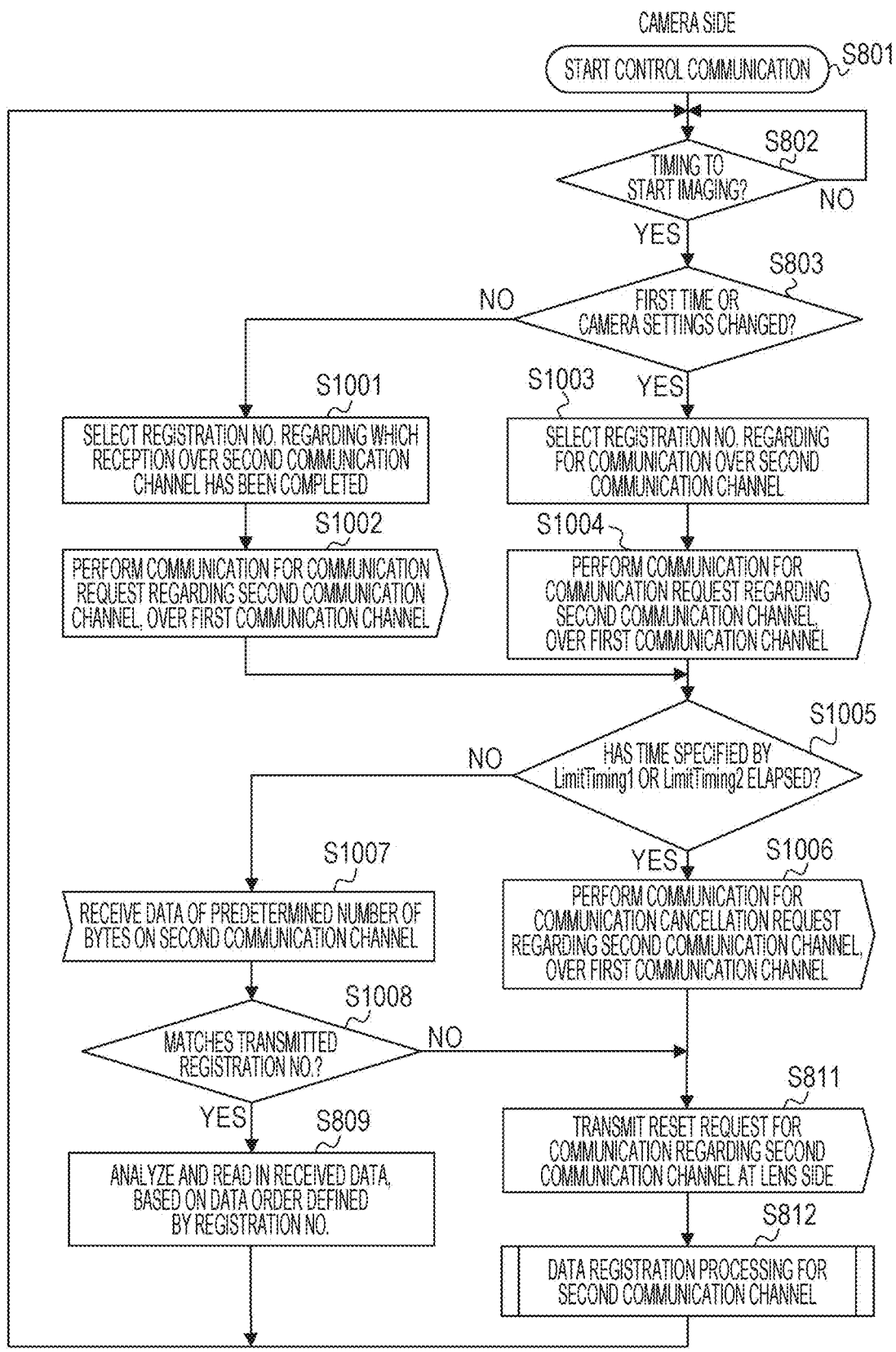
FIG. 10A is a flowchart illustrating communication processing that the lens microprocessor performs over the second communication channel one or more aspects of the present disclosure.
Figure 10B:
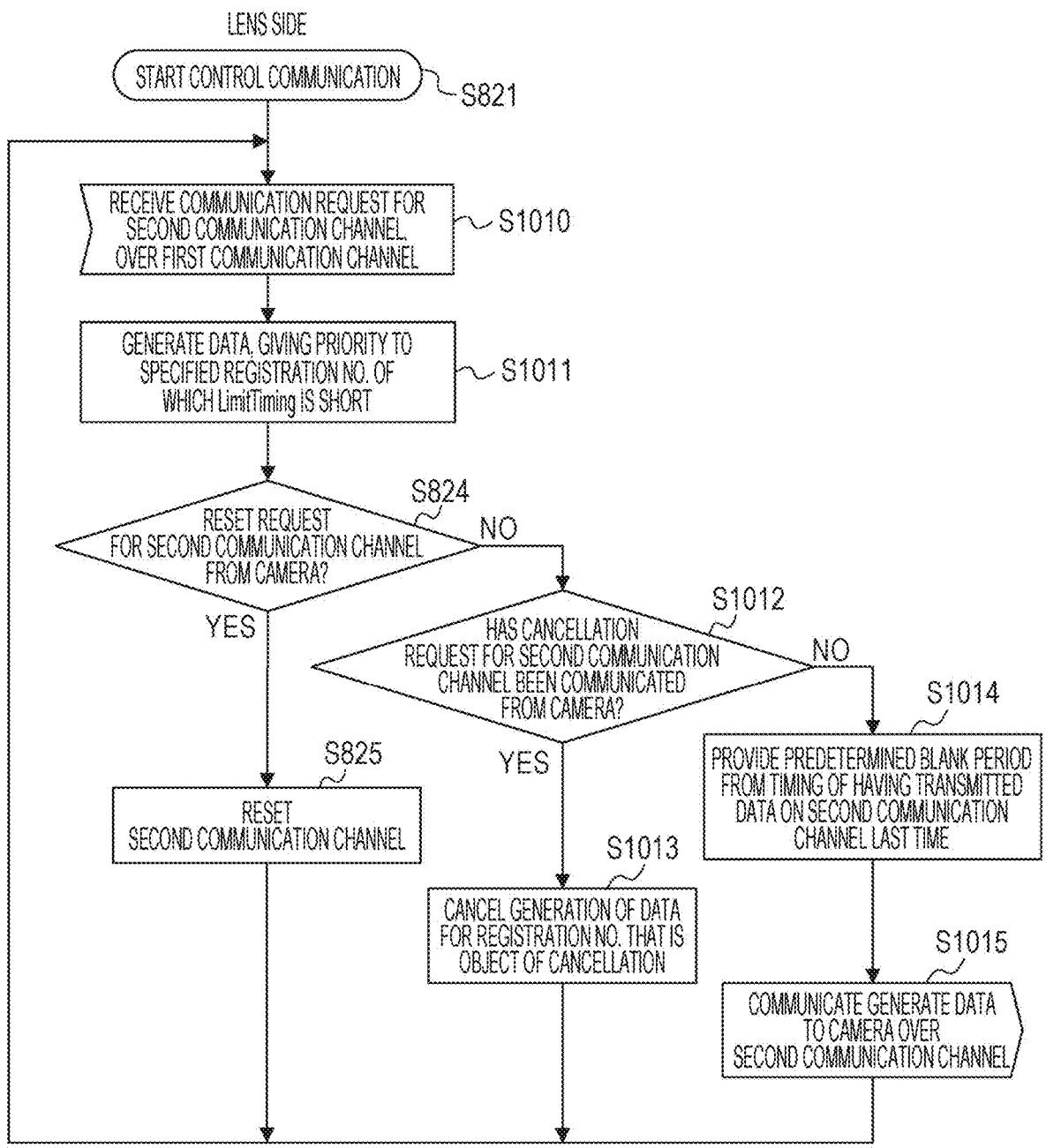
FIG. 10B is a flowchart illustrating communication processing that the camera microprocessor performs over the second communication channel one or more aspects of the present disclosure.

Next, the communication processing that the camera microprocessor 205 and lens microprocessor 111 each perform in the communication illustrated in FIG. 9 will be described with the flowchart in FIGS. 10a and 10B. Steps in FIGS. 10a and 10B that are the same as steps shown in FIGS. 8A and 8B will be denoted by the same step numbers, and description will be omitted.

First, communication processing that the camera microprocessor 205 performs will be described with reference to FIG. 10A. The camera microprocessor 205 passes through S801 and S802 and advances to S803. In a case where communication processing is being performed for the first time in S803, or the camera settings have been changed, the camera microprocessor 205 selects multiple optical data definitions (registration Nos.) corresponding to the optical data regarding which the lens microprocessor 111 is to be requested to transmit, from the multiple registered optical data definitions in S1003.

Next, in S1004, the camera microprocessor 205 transmits the second channel multiple communication request command 902, registration count command 903, registration No. command 904, and LimitTiming1 command 905, to the lens microprocessor 111 via the first communication channel. The camera microprocessor 205 further transmits the registration No. command 906 and LimitTiming2 command 907 to the lens microprocessor 111 via the first communication channel. Thereafter, the camera microprocessor 205 advances to S1005.

On the other hand, in a case where the communication processing is the second time in S803, the camera microprocessor 205 advances to S1001. In S1001, the camera microprocessor 205 re-selects the registration No. corresponding to the optical data of which reception from the lens microprocessor 111 has already been completed (registration No. 2 in FIG. 9). Specifically, in a case where the registration Nos. indicated by the registration No. commands 904 and 906 transmitted to the lens microprocessor 111 are a registration No. for AF processing of which the control cycle is short, and a registration No. for AE processing of which the control cycle is long, the registration No. for AF processing is re-selected. The reason is that the communication processing on the second communication channel for AF processing of which the control cycle is short is completed quicker than the communication processing on the second communication channel for AE processing of which the control cycle is long, so a registration No. command indicating a registration No. for AF processing is transmitted to the lens microprocessor 111 each time.

Next, in S1002, the camera microprocessor 205 transmits the second channel communication request command 921, registration No. command 922 indicating the registration No. re-selected in S1001, and LimitTiming command 923 to the lens microprocessor 111 using the first communication channel. At this time, in a case where multiple registration Nos. are re-selected, a second channel multiple communication request command is transmitted to the lens microprocessor 111 instated of a second channel communication request command. Thereafter, the camera microprocessor 205 advances to S1005.

In S1005, the camera microprocessor 205 determines whether limit time LimitTiming1 or LimitTiming2 has elapsed. In a case where a limit time has elapsed, the camera microprocessor 205 advances to S1006, and in a case where reception of the optical data from the lens microprocessor 111 via the second communication channel has been confirmed in S1007 before the limit time elapses, advances to S1008. Judgement of reception of the optical data is performed by having detected the start bit serving as reception data in the communication waveforms illustrated in FIG. 4B2, for example.

In S1006, the camera microprocessor 205 transmits a communication cancellation request command (0xE1 in FIG. 12) to the lens microprocessor 111, to request cancellation of communication on the second communication channel. The flow then advances to S811.

In S1008, in a case of having transmitted a registration No. command indicating multiple registration Nos. to the lens microprocessor 111 in S1004 or S1002, the camera microprocessor 205 determines whether or not a registration No. corresponding to the multiple registration Nos. is included in the optical data received in S1007. In a case where the camera microprocessor 205 receives optical data from the lens microprocessor 111 in S1007, a registration No. corresponding to that optical data is received as well. Accordingly, even in a case of having transmitted registration No. commands indicating multiple registration Nos. to the lens microprocessor 111 in S1002 or S1004, which registration No. command a response is being made to can be determined. In a case where a registration No. corresponding to the optical data received in S1007 is included in the multiple registration Nos., the camera microprocessor 205 advances to S809, receives optical data from the lens microprocessor 111 in the same way as in the first embodiment, and returns to S802. On the other hand, if no registration No. corresponding to the received optical data is included, there is a possibility of a communication abnormality, so the camera microprocessor 205 passes through S811 and S812 and returns to S802.

Next, communication processing that the lens microprocessor 111 performs will be described with reference to FIG. 10B. In S1010 after S821, the lens microprocessor 111 receives the second channel multiple communication request command, registration No. command, and so forth, that the camera microprocessor 205 has transmitted in S1004 or S1002, via the first communication channel.

Next, in S1011, the lens microprocessor 111 performs priority determination processing for setting the order of priority for generating optical data, with regard to the multiple registration No. commands received in S1010. Specifically, the lens microprocessor 111 compares the absolute limit time derived from the limit time LimitTiming set for the multiple registration Nos. Priority is given to generation of optical data corresponding to the registration No. of which the absolute limit time is earlier.

This will be described with reference to FIG. 9. The lens microprocessor 111 derives a first absolute limit time at which the limit time LimitTiming1 set with regard to the registration No. (904) elapses from the time of having received the second channel multiple communication request command 902 that the camera microprocessor 205 has transmitted in S1003. In the same way, the lens microprocessor 111 derives a second absolute limit time at which the limit time LimitTiming2 set with regard to the registration No. (906) elapses from the time of having received the second channel multiple communication request command 902 that the camera microprocessor 205 has transmitted in S1003. The first absolute limit time is earlier than the second absolute limit time, so the lens microprocessor 111 generates with priority the optical data corresponding to the registration No. (904) to which the first absolute limit time has been set.

More specifically, optical data corresponding to the registration No. (904) to which the first absolute limit time has been set is generated. After ending generation of the optical data corresponding to the registration No. (904) to which the first absolute limit time has been set, optical data corresponding to the registration No. (906) to which the second absolute limit time has been set is generated.

In the other hand, the lens microprocessor 111 that has received the second channel communication request command 921 from the camera microprocessor 205 in S1002 derives a third absolute limit time at which the limit time LimitTiming3 set with regard to the registration No. (922) elapses from the time of that reception. The second absolute limit time is earlier than the third absolute limit time, so the lens microprocessor 111 generates with priority the optical data corresponding to the registration No. (906) to which the second absolute limit time has been set.

Next, the lens microprocessor 111 determines whether or not a communication reset request command has been received from the camera microprocessor 205 in S824, and if not received, advances to S1012. In a case of having received a communication reset request command, the lens microprocessor 111 passes through S825 and returns to S1010.

In S1012, the lens microprocessor 111 determines whether or not a communication cancellation request command has been received from the camera microprocessor 205. If a communication cancellation request command has been received, the lens microprocessor 111 advances to S1013, and if not, to S1014.

In S1013, the lens microprocessor 111 cancels generation of optical data corresponding to the registration No. that is the object of cancellation. That is to say, in a case where the communication cancellation request command received in S1012 is a command to cancel all communication requests on the second communication channel (0xE3) shown in FIG. 15, the lens microprocessor 111 stop all communication on the second communication channel. In a case where the communication cancellation request command is the command (0xE1) shown in FIG. 12, generation of optical data corresponding to the registration No. specified by the subsequently-received registration No. command (e.g., 0x01) is cancelled. Thereafter, the lens microprocessor 111 returns to S1010.

In S1014, the lens microprocessor 111 provides a communication blank time (predetermined time) starting at the timing of having transmitted optical data to the camera microprocessor 205 via the second communication channel in a later-described S1015. This communication blank time is time necessary for the camera microprocessor 205 to analyze and read in optical data stored in the data reception buffer 330 in S809 when communication is performed from the lens microprocessor 111 to the camera microprocessor 205 in S1015.

The communication blank time may be decided between the camera microprocessor 205 and lens microprocessor 111 beforehand, or may be notified from the camera microprocessor 205 to the lens microprocessor 111 in step S504 described in the first embodiment.

In S1015, the lens microprocessor 111 transmits optical data, corresponding to the registration No. that is determined to be of the highest priority in S1011, to the camera microprocessor 205, over the second communication channel. Thereafter, the lens microprocessor 111 returns to S1010.

According to the present embodiment as well, even in cases where great amounts of optical data are to be received at the camera microprocessor 205 from the lens microprocessor 111, delay of operations corresponding to control commands, such as zooming, light amount adjustment, focusing, and image stabilization, and so forth at the interchangeable lens 100, can be reduced, in the same way as with the first embodiment. Further, in the present embodiment, in a case where there are multiple sets of optical data (registration Nos.) for the camera microprocessor 205 to receive from the lens microprocessor 111, transmission of optical data can be individually requested in accordance with control cycles and usage priority level at the camera body 200.

Accordingly, usage of communication bandwidth between the camera microprocessor 205 and lens microprocessor 111 can be optimized.

It should be noted that the above-described embodiments are only representative examples, and that various modifications and alterations may be made to the embodiments when carrying out the present invention.

OTHER EMBODIMENTS

Figure 16:
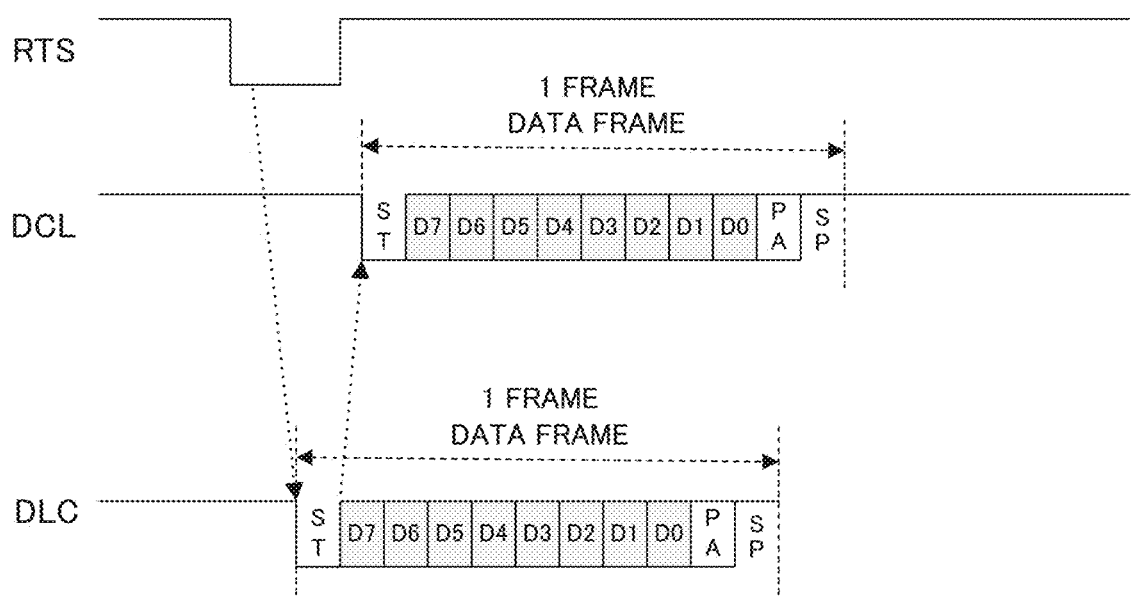
FIG. 16 is a diagram illustrating waveforms of signals transmitted and received between the camera microprocessor and lens microprocessor by three-line asynchronous communication.

Regarding the first communication channel, communication by three-line clock synchronous communication is shown in the first embodiment and the second embodiment. As explained earlier, three-line asynchronous communication can be applied to the first embodiment and the second embodiment instead of the three-line clock synchronous communication. Shown in FIG. 16 is waveforms of signals transmitted and received between the camera microprocessor 205 and lens microprocessor 111 by the three-line asynchronous communication. A request-to-send (RTS) communication line (RTS) serves as a first communication line when asynchronous communication (using three lines) is performed. The RTS communication line is a communication line that supplies transmission request signals serving as timing signals for obtaining data from the camera microprocessor 205 that is the communication master for the lens microprocessor 111.

The transmission request channel, for example, is used for providing notices such as transmission requests (transmission instructions) for the lens data, and switch requests (switch instructions) for communication processes described later, from the camera microcomputer 205 to the lens microcomputer 111. The provision of the transmission request is performed by switching a signal level (voltage level) on the transmission request channel between High as a first level and Low as a second level. A transmission request signal provided to the transmission request channel is hereinafter referred to as "request-to-send signal RTS". The request-to-send signal RTS is provided from the camera microcomputer 205 serving as a communication master to the lens microcomputer 111 serving as a communication slave.

When the request-to-send signal RTS is received, the lens microcomputer 111 sets the signal level to Low in one bit time period in order to provide a notice of a start of one frame transmission of the lens data signal DLC to the camera microcomputer 205. The one bit time period indicating a start of one frame is called "start bit ST" in this embodiment. That is, one data frame starts from this start bit ST. The start bit ST is provided as a head bit of each one frame of the lens data signal DLC. Next, the lens microcomputer 111 transmits one-byte lens data in an 8-bit time period, from a subsequent second bit to a ninth bit. The data bits are arranged in a most significant bit (MSB)-first format starting from a highest-order data bit D7 and continuing to data bits D6, D5, D4, D3, D2 and D1 in this order, and ending with a lowest-order data bit D0. The lens microcomputer 111 then adds one bit parity information (parity bit) PA at a tenth bit and sets the signal level of the lens data signal DLC to High in a time period of a stop bit SP indicating an end of the one frame. Thus, the data frame starting from the start bit SP ends.

As explained above, when the three-line asynchronous communication is performed at first communication channel, the communication via the second communication line and the third communication line is performed at corresponding timing with the request-to-send signal RTS transmitted via the RTS communication line. In other words, the camera microprocessor 205 serves as a communication master to control timing of the communication performed at the first communication channel.

On the other hand, the lens microprocessor 111 serves as a communication master to control timing of the communication performed at the second communication channel, and communication can be performed at a timing not dependent on the timing of communication by the first communication channel. More specifically, communication by the second lens-camera communication line can be performed at a timing regardless of timings corresponding to clock signals transmitted from the camera microprocessor 205 to the lens microprocessor 111 via the clock communication line.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2017-108204 filed on May 31, 2017 and 2018-095847, filed on May 18, 2018 which are hereby incorporated by reference herein in their entirety.

What is claimed is:

1. An imaging apparatus to which an accessory device is detachably mounted, the imaging apparatus comprising at least one processor or circuit configured to perform operations of a control unit configured to control communication with the accessory device,
    wherein the imaging apparatus and the accessory device communicate with each other via a first communication line, a second communication line, a third communication line, and a fourth communication line,
    wherein a control signal controlling communication performed via the third communication line is transmitted via the first communication line,
    wherein a first command and a second command are transmitted via the second communication line,
    wherein data is received via the third communication line in response to a transmission of the first command, and
    wherein optical data of the accessory device specified by the second command is received via the fourth communication line in response to a transmission of the second command.

2. The imaging apparatus according to claim 1,
    wherein the control unit transmits the first command via the second communication line, regardless of whether or not the control unit is receiving the optical data via the fourth communication line.

3. The imaging apparatus according to claim 1,
    wherein the first command is a command controlling operations of the accessory device,
    wherein the second command is a command specifying the optical data to be sent from the accessory device via the fourth communication line, and
    wherein the optical data and the data are different.

4. The imaging apparatus according to claim 1,
    wherein the control unit transmits, to the accessory device, a rate specification command specifying a communication rate of the optical data of which transmission is requested, via the second communication line.

5. The imaging apparatus according to claim 1,
    wherein the control unit transmits a registration specification command, which is stored in the accessory device and specifies one of a plurality of registration information indicating types of the optical data, via the second communication line.

6. The imaging apparatus according to claim 5,
    wherein, in a case where a registration information, that the control unit has received along with optical data corresponding to the registration specification command that the control unit has transmitted to the accessory device, is not a registration information corresponding to the registration specification command that the control unit has specified, the control unit transmits, to the accessory device, a communication request command instructing resetting of the fourth communication line, via the second communication line.

7. The imaging apparatus according to claim 6,
    wherein the plurality of registration information is information indicating a transmission order of the optical data.

8. The imaging apparatus according to claim 7,
    wherein the plurality of registration information differs from each other with regard to at least one of a combination of optical data indicated by each registration information, and the transmission order thereof.

9. The imaging apparatus according to claim 1,
    wherein the control unit transmits, to the accessory device, a communication request command and communication cancellation request command, respectively instructing executing transmission and cancellation of the optical data, via the second communication line.

10. The imaging apparatus according to claim 9,
    wherein the control unit transmits, along with the communication request command, a limit time command indicating a time limit for the accessory device to transmit the optical data.

11. The imaging apparatus according to claim 10,
    wherein, in a case where the control unit has not received transmission of optical data from the accessory device within the time limit indicated by the limit time command that the control unit has transmitted, the control unit transmits, to the accessory device, the communication cancellation request command, via the second communication line.

12. The imaging apparatus according to claim 1,
    wherein, in a case where an abnormality is detected in communication of the optical data that the control unit performs, the control unit notifies the accessory device of the communication abnormality via the second communication line.

13. The imaging apparatus according to claim 1,
    wherein the control unit determines whether or not the accessory device can transmit the optical data via the fourth communication line, and
    in a case where the accessory device can transmit the optical data via the fourth communication line, the optical data is received via the fourth communication line, and
    in a case where the accessory device cannot transmit the optical data via the fourth communication line, the optical data is received via the second communication line.

14. The imaging apparatus according to claim 1,
    wherein, in a case where data specified by the second command is not received via the fourth communication line even if a predetermined amount of time elapses after having transmitted the second command, the control unit transmits a third command corresponding to cancellation of the second command via the second communication line.

15. The accessory device according to claim 1,
wherein, in a case where data specified by the second command is not transmitted via the fourth communication line, and a third command corresponding to cancellation of the second command is received via the second communication line, the control unit cancels processing relating to transmission of data specified by the second command.

16. The imaging apparatus according to claim 1,
wherein the control signal is a transmission request of the data received via the third communication line.

17. The accessory device according to claim 1,
wherein the control signal is a transmission request of the data received via the third communication line.

18. The imaging apparatus according to claim 1,
wherein communication performed via the fourth communication line is one-way asynchronous communication from the accessory device.

19. The accessory device to which an imaging apparatus is detachably mounted, the accessory device comprising at least one processor or circuit configured to perform operations of a control unit configured to control communication with the imaging apparatus,
wherein the accessory device and the imaging apparatus communicate with each other via a first communication line, a second communication line, a third communication line, and a fourth communication line,
wherein a control signal controlling communication performed via the third communication line is received via the first communication line,
wherein a first command and a second command are received via the second communication line,
wherein data is transmitted via the third communication line in response to a reception of the first command, and
wherein optical data of the accessory device specified by the second command is transmitted via the fourth communication line in response to a reception of the second command.

20. The accessory device according to claim 19,
wherein the control unit receives the first command via the second communication line, regardless of whether or not the control unit is transmitting the optical data.

21. The accessory device according to claim 19,
wherein the first command is a command controlling operations of the accessory device,
wherein the second command is a command specifying the optical data to be sent from the accessory device via the fourth communication line, and
wherein the optical data and the data are different.

22. The accessory device according to claim 19,
wherein the control unit stores a plurality of registration information indicating types of the optical data to be transmitted to the imaging apparatus,
and wherein, upon receiving a registration specification command specifying the registration information from the imaging apparatus, the control unit transmits, to the imaging apparatus, the optical data of a type corresponding to the registration information specified by the registration specification command.

23. The accessory device according to claim 22,
wherein, in a case where a registration information that does not correspond with the registration specification command that the control unit has received is transmitted along with optical data in response to the received registration specification command, and the control unit receives a transmission request command from the imaging apparatus instructing resetting of the fourth communication line via the second communication line, the control unit resets the fourth communication line.

24. The accessory device according to claim 23,
wherein the plurality of registration information is information indicating a transmission order of the optical data,
and wherein the control unit transmits the optical data of a type corresponding to the registration information specified by the registration specification command, in a transmission order corresponding to the registration information.

25. The accessory device according to claim 24,
wherein the plurality of registration information differs from each other with regard to at least one of a combination of optical data indicated by each registration information, and the transmission order thereof.

26. The accessory device according to claim 19,
wherein the control unit determines whether or not the imaging apparatus can receive the optical data via the fourth communication line, and
in a case where the imaging apparatus can receive the optical data via the fourth communication line, the optical data is transmitted via the fourth communication line, and
in a case where the imaging apparatus cannot receive the optical data via the fourth communication line, the optical data is transmitted via the second communication line.

27. The accessory device according to claim 19,
wherein communication performed via the fourth communication line is one-way asynchronous communication to the imaging apparatus.

28. A communication control method of an imaging apparatus to which an accessory device is detachably mounted, the method comprising:
performing communication between the imaging apparatus and the accessory device via a first communication line, a second communication line, a third communication line, and a fourth communication line,
transmitting a control signal controlling communication performed via the third communication line via the first communication line,
transmitting a first command and a second command via the second communication line;
receiving data via the third communication line in response to a transmission of the first command; and
receiving optical data of the accessory device specified by the second command via the fourth communication line in response to a transmission of the second command.

29. A communication control method of an accessory device to which an imaging apparatus is detachably mounted, the method comprising:
performing communication between the accessory device and the imaging apparatus via a first communication line, a second communication line, a third communication line, and a fourth communication line,
receiving a control signal controlling communication performed via the third communication line via the first communication line,
receiving a first command and a second command via the second communication line;
transmitting data via the third communication line in response to a reception of the first command; and transmitting optical data of the accessory device specified by the second command via the fourth communication line in response to a reception of the second command.

\* \* \* \* \*